(12) United States Patent
Govil et al.

(10) Patent No.: US 11,823,343 B1
(45) Date of Patent: Nov. 21, 2023

(54) METHOD AND DEVICE FOR MODIFYING CONTENT ACCORDING TO VARIOUS SIMULATION CHARACTERISTICS

(71) Applicant: Apple Inc., Cupertino, CA (US)

(72) Inventors: Dhruv Aditya Govil, San Mateo, CA (US); Sabine Webel, Sunnyvale, CA (US); Olivier Denis Roger Gutknecht, San Francisco, CA (US); Shruti Singhal, San Jose, CA (US); Tobias Eble, Sunnyvale, CA (US); Pal Kristian Engstad, Los Angeles, CA (US); Ivan Gavrenkov, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/208,673

(22) Filed: Mar. 22, 2021

Related U.S. Application Data

(60) Provisional application No. 63/000,240, filed on Mar. 26, 2020.

(51) Int. Cl.
*G06T 19/20* (2011.01)
*G06T 19/00* (2011.01)
*G02B 27/01* (2006.01)

(52) U.S. Cl.
CPC .......... *G06T 19/20* (2013.01); *G02B 27/0101* (2013.01); *G06T 19/003* (2013.01); *G06T 19/006* (2013.01); *G06T 2219/2012* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 2012/0113092 | A1* | 5/2012 | Bar-Zeev | G06F 3/012 345/419 |
| 2012/0249416 | A1* | 10/2012 | Maciocci | G06F 3/011 345/156 |
| 2016/0147067 | A1* | 5/2016 | Hua | G02B 27/017 345/419 |
| 2017/0131964 | A1* | 5/2017 | Baek | G06T 19/006 |
| 2017/0311012 | A1* | 10/2017 | Griffiths | H04N 5/2357 |
| 2018/0089903 | A1* | 3/2018 | Pang | H04N 13/161 |
| 2018/0275410 | A1* | 9/2018 | Yeoh | H04N 13/344 |
| 2020/0027201 | A1* | 1/2020 | Chen | G06T 15/205 |
| 2020/0334823 | A1* | 10/2020 | Bleyer | G06T 7/593 |
| 2021/0004996 | A1* | 1/2021 | Murillo | G06T 11/001 |

* cited by examiner

*Primary Examiner* — Charles Tseng
(74) *Attorney, Agent, or Firm* — Fernando & Partners, LLP

(57) ABSTRACT

A method and device for modifying virtual content according to various simulation characteristics includes obtaining first virtual content; obtaining one or more simulation characteristics; and generating second virtual content by modifying the first virtual content according to the one or more simulation characteristics; and presenting the second virtual content.

20 Claims, 24 Drawing Sheets

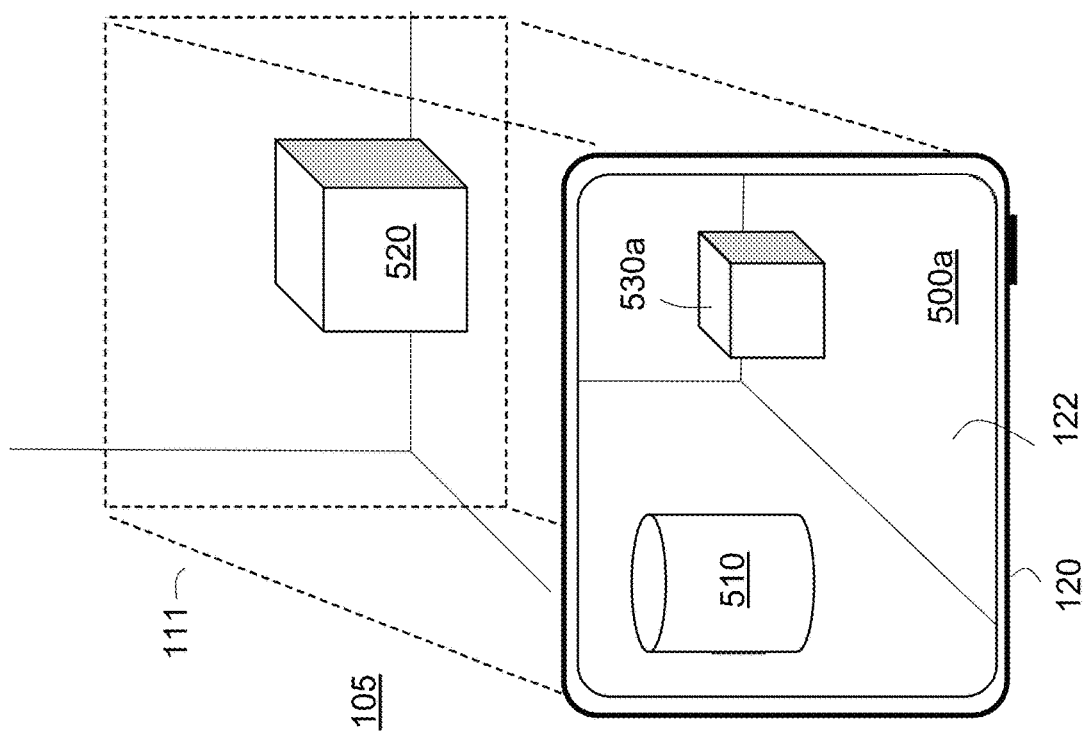

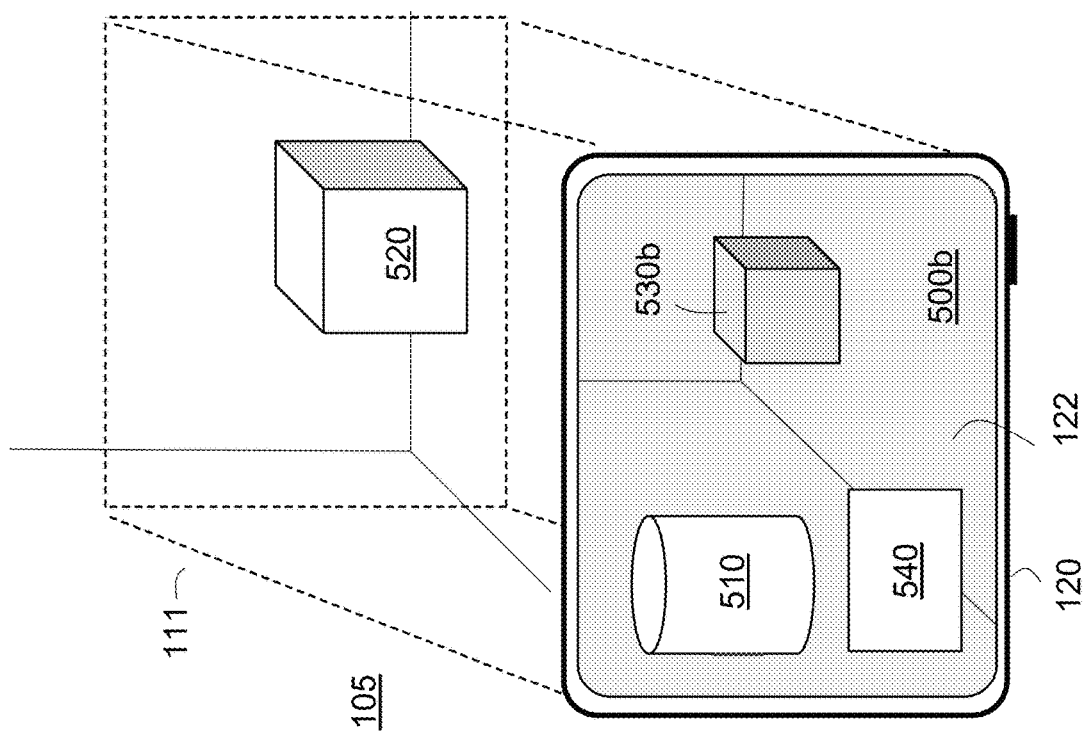

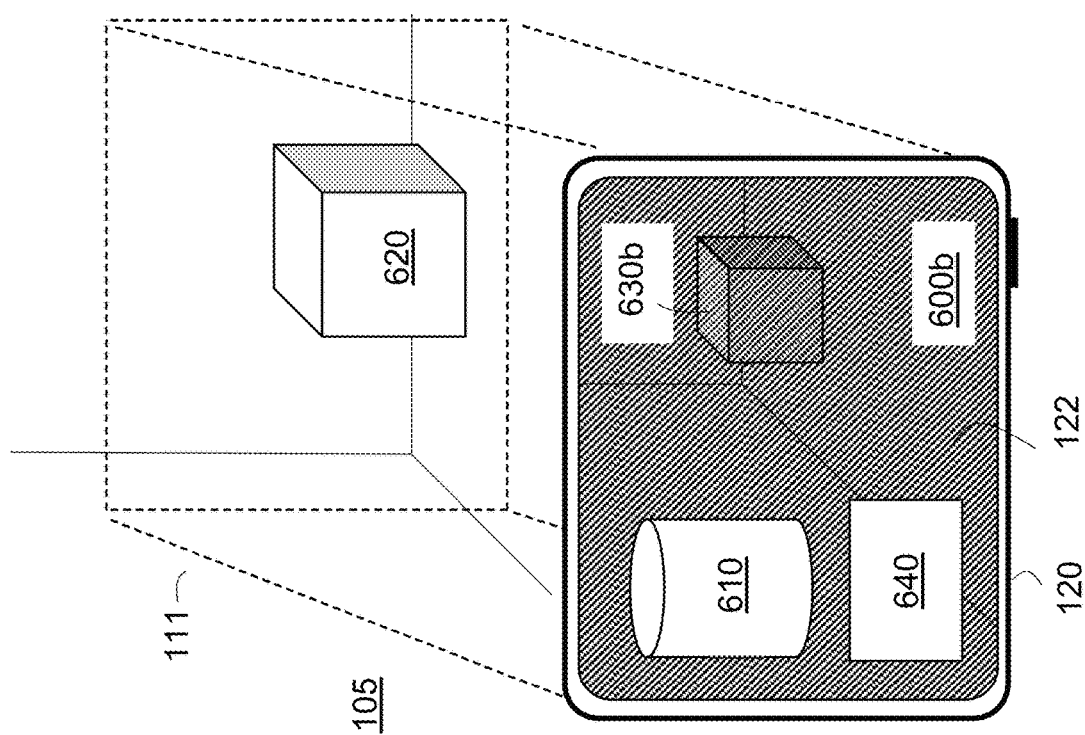

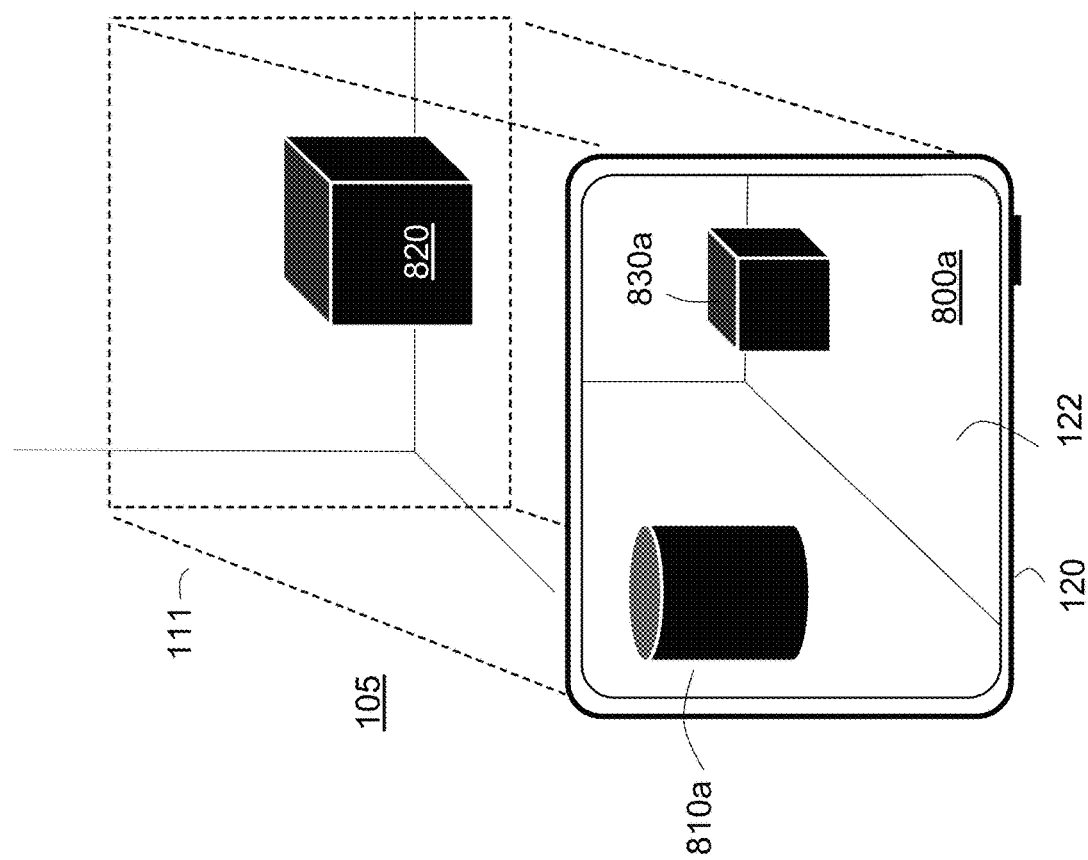

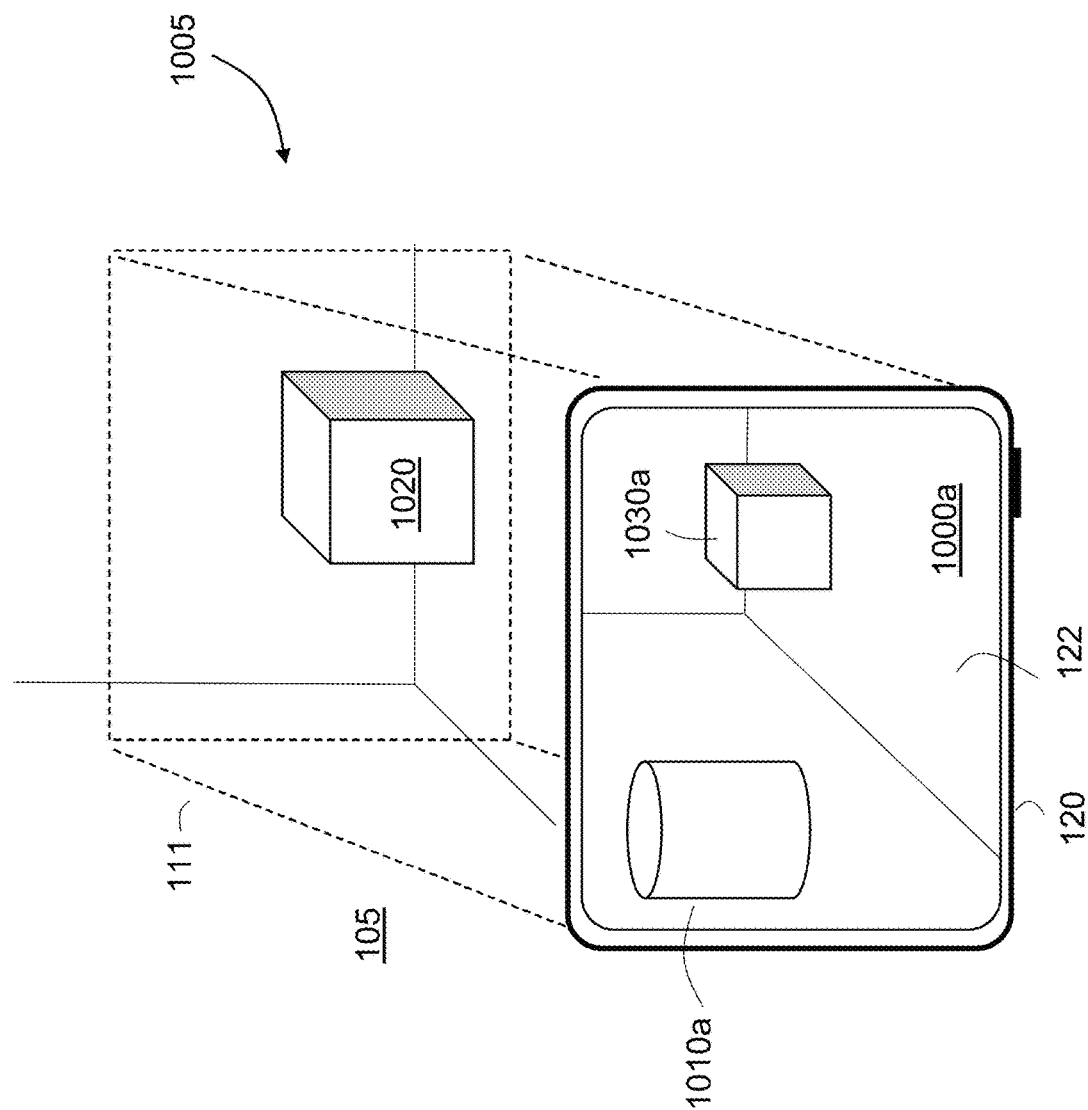

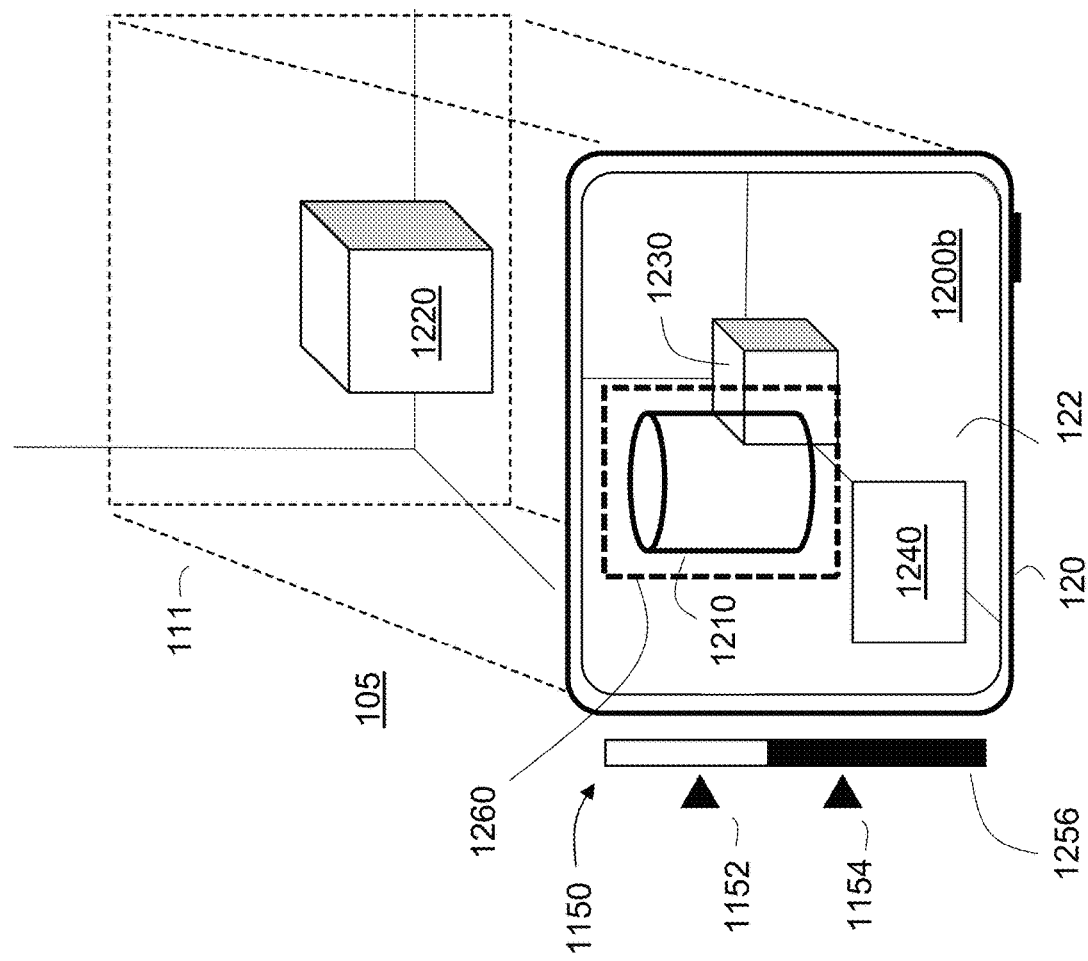

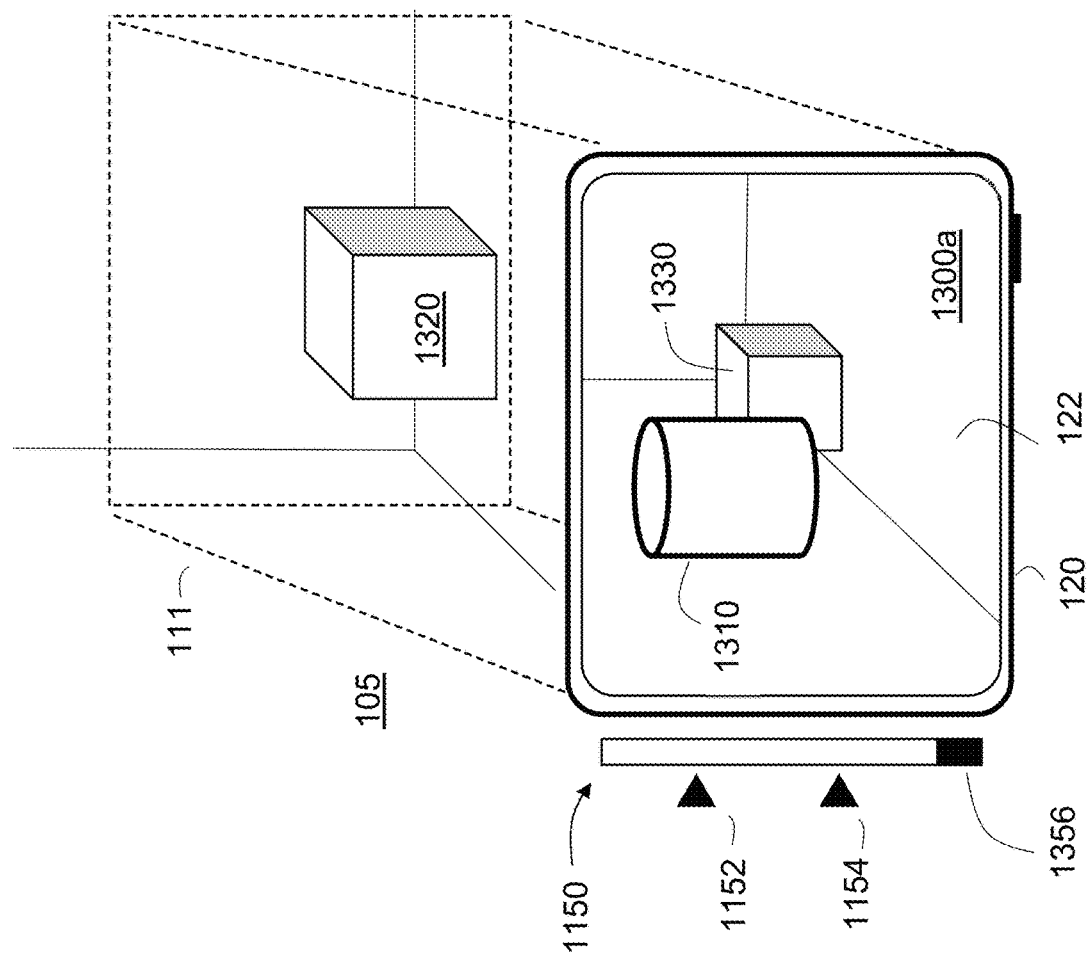

METHOD AND DEVICE FOR MODIFYING CONTENT ACCORDING TO VARIOUS SIMULATION CHARACTERISTICS

CROSS-REFERENCE TO RELATED APPLICATIONS

This application claims the benefit of U.S. Provisional Patent App. No. 63/000,240, filed on Mar. 26, 2020, which is incorporated by reference in its entirety.

TECHNICAL FIELD

The present disclosure generally relates to presenting content, and in particular, to systems, methods, and devices for modifying virtual content according to various simulation characteristics.

BACKGROUND

As one example, a user may attempt to simulate visual content intended for display on an optical see-through display by presenting that imagery on an opaque display without see-through functionality (e.g., LCD, LED, OLED, CRT, or the like). Imagery may appear differently to viewers when presented on an optical see-through display as compared to an opaque display. Current systems lack logic to simulate the differences inherent to presentation of imagery on optical see-through displays and present that imagery accurately onto an opaque display. Simulating aspects of presentation of imagery on a see-through display with an opaque display can enhance efficiency and effectiveness of prototyping, developing, and testing systems and devices incorporating optical see-through displays. Thus, according to some implementations, a virtual content modification and simulation system will present virtual content on an opaque display with presentation characteristics associated with a particular see-through display or type of see-through display.

By the same token, imagery presented on a simulated optical see-through display may be placed in or proximate to a static or dynamically changing region of the display, which, in turn, causes user perception of the imagery to be difficult. Current systems lack logic to identify potential user perception difficulties or to suggest alternatives placement for content. Thus, according to some implementations, a virtual content modification and simulation system presents notifications or modifies virtual content on a simulated optical see-through display when one or more metrics indicate difficulty with user perception of the virtual content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A and 5B illustrate a sequence of instances for modifying virtual content based on device lens characteristics, in accordance with some implementations.

FIGS. 6A and 6B illustrate another sequence of instances for modifying virtual content based on device lens characteristics, in accordance with some implementations.

FIGS. 8A and 8B illustrate a sequence of instances for modifying virtual content based on user characteristics, in accordance with some implementations.

FIGS. 10A and 10B illustrate a sequence of instances for modifying virtual content based on environment characteristics, in accordance with some implementations.

FIGS. 12A and 12B illustrate a sequence of instances for improving user perception of virtual content based on satisfaction of a recommended viewability threshold, in accordance with some implementations.

FIGS. 13A and 13B illustrate a sequence of instances for optimizing an optical see-through display device on a video pass-through display device based on satisfaction of neither a critical viewability threshold nor a recommended viewability threshold, in accordance with some implementations.

Figure 1:
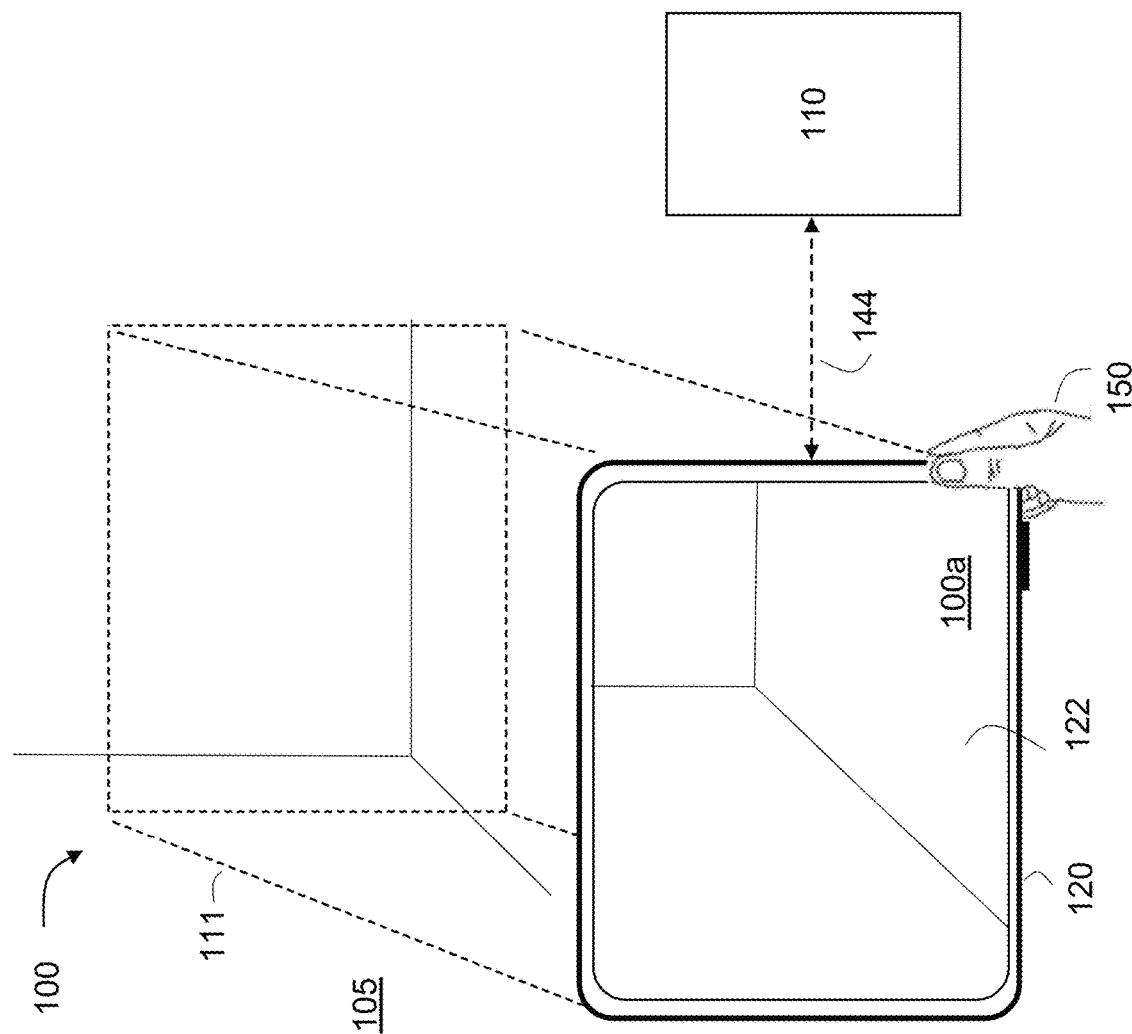
FIG. 1 is a block diagram of an example operating architecture, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for modifying virtual content according to various simulation characteristics. According to some implementations, the method is performed at a computing system includes one or more processors, non-transitory memory, an interface for communicating with a display device and one or more input devices. The method includes obtaining first virtual content. The method further includes obtaining one or more simulation characteristics. In response to obtaining the simulation characteristics, the method further includes generating second virtual content by modifying the first virtual content according to the one or more simulation characteristics. In response to generating second virtual content, the method further includes presenting the second virtual content.

Various implementations disclosed herein include devices, systems, and methods for improving user perception of virtual content. The method includes obtaining a background object and a foreground object. The method further includes generating a viewability metric for the foreground object based on at least one visual property of at least a portion of the foreground object, and at least a portion of the background object proximate to the foreground object. The method further includes, in accordance with a determination that the viewability metric satisfies a critical viewability threshold: modifying at the least one visual property of the foreground object; and presenting, at least a portion of the modified foreground object.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, wearable computing device, or the like).

In some implementations, the controller 110 is configured to manage and coordinate an XR experience (sometimes also referred to herein as an "XR environment" or a "virtual environment" or a "graphical environment") for a user 150. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR experience to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content and to enable video pass-through of the physical environment 105 on a display 122. In some implementations, a viewable environment 100a represents a video representation of the physical environment 105 within the FOV 111 of the electronic device 120. For example, the electronic device 120 corresponds to a mobile phone, tablet, laptop, wearable computing device, or the like. In various figures herein, example viewable environment according to various implementations are presented as viewable environments 500a, 500b, 600a, 600b, 700a, 700b, 800a, 800b, 900a, 900b, 1000a, 1000b, 1100a, 1100b, 1200a, 1200b, 1300a, or 1300b.

In one example, the XR content corresponds to display-locked content such that the XR content remains displayed at the same location on the display 122 as the FOV 111 changes due to translational and/or rotational movement of the electronic device 120. As another example, the XR content corresponds to world-locked content such that the XR content remains displayed at its origin location as the FOV 111 changes due to translational and/or rotational movement of the electronic device 120. As such, in this example, if the FOV 111 does not include the origin location, the XR experience will not include the XR content. For example, the electronic device 120 corresponds to a near-eye system, mobile phone, tablet, laptop, wearable computing device, or the like.

In some implementations, the display 122 corresponds to an additive display that enables optical see-through of the physical environment 105. For example, the display 122 correspond to a transparent lens, and the electronic device 120 corresponds to a pair of glasses worn by the user 150. As such, in some implementations, the electronic device 120 presents a user interface by projecting the XR content onto the additive display, which is, in turn, overlaid on the physical environment 105 from the perspective of the user 150. In some implementations, the electronic device 120 presents the user interface by displaying the XR content on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the field-of-view of the user 150. In such implementations, the electronic device 120 presents the XR environment by displaying data corresponding to the XR environment on the one or more displays or by projecting data corresponding to the XR environment onto the retinas of the user 150.

In some implementations, the electronic device 120 includes an integrated display (e.g., a built-in display) that displays the XR environment. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment based on movement information (e.g., body pose data, eye tracking data, hand tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like. In some implementations, the one or more input devices track at least one of hand gestures and eye or gaze direction.

Figure 2:
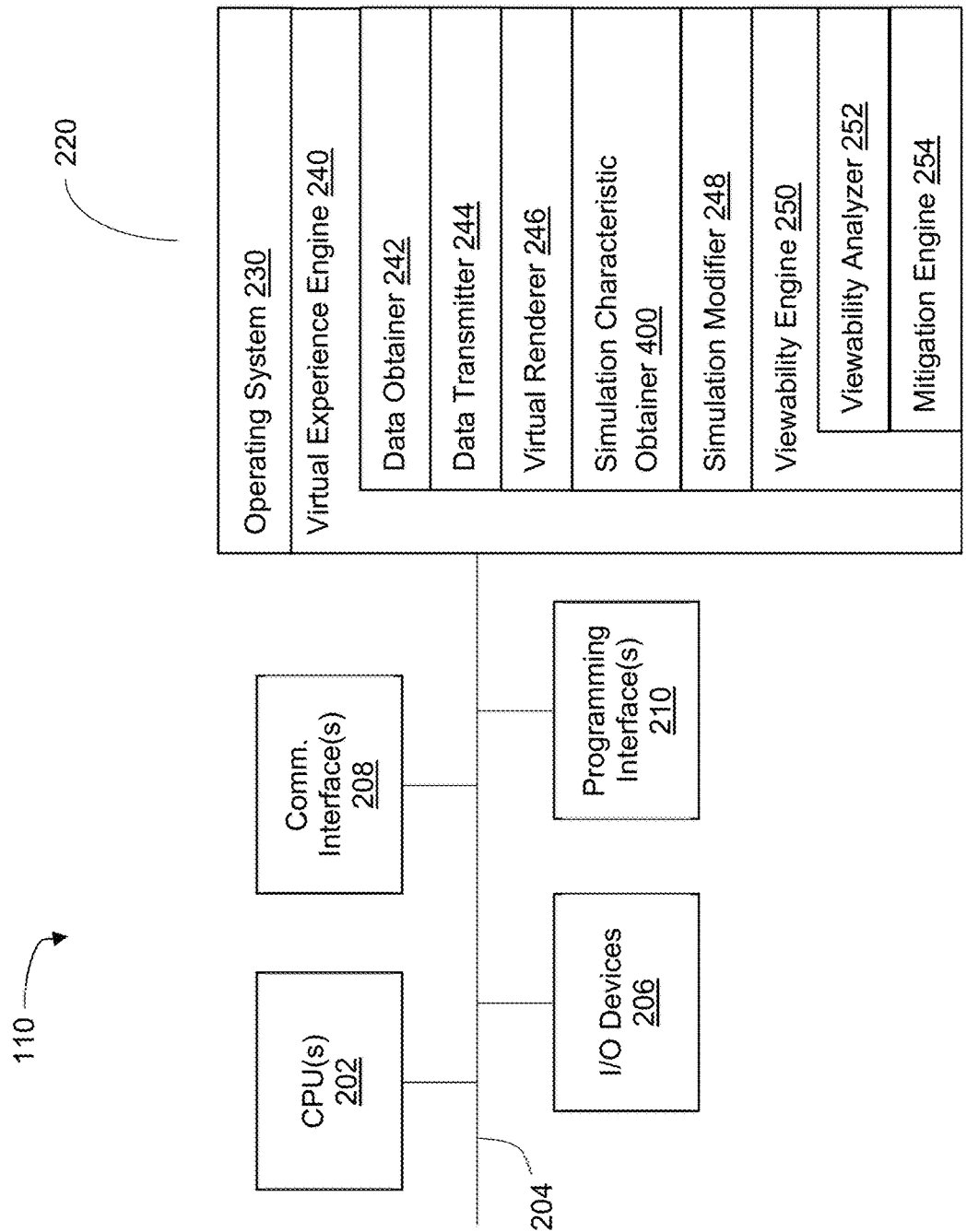
FIG. 2 is a block diagram of an example controller, in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, input devices include one or more cameras, a touchscreen, and microphone devices, among others. Camera and microphone devices may respectively capture visual or audio information within or outside ranges of human perception, and may include ultrasonic, infrared, or other frequencies of light or sound. In some implementations, output devices include speakers, display devices, and haptic feedback motors, among others. Displays may include flat-panel displays, wearable displays with transparent, translucent, or opaque displays, projectors, or other two- or three-dimensional display devices.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a virtual experience engine 240.

The operating system 230 includes procedures for handling various basic system services and for performing hardware dependent tasks. To that end, in various implementations, the operating system 230 includes instructions and/or logic therefor, and heuristics and metadata therefor.

In some implementations, the virtual experience engine 240 is configured to manage and coordinate virtual content or XR experiences (sometimes also referred to herein as "XR environments") for one or more users (e.g., a single XR experience for one or more users, or multiple XR experiences for respective groups of one or more users). To that end, in various implementations, the virtual experience engine 240 includes a data obtainer 242, a data transmitter 244, a virtual renderer 246, a simulation characteristic obtainer 400, a simulation modifier 248, and a viewability engine 250.

In some implementations, the data obtainer 242 is configured to obtain data (e.g., presentation data, input data, user interaction data, head tracking information, camera pose tracking information, eye tracking information, hand/limb tracking information, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the data transmitter 244 is configured to transmit data (e.g., presentation data such as rendered image frames associated with the XR environment, location data, etc.) to at least the electronic device 120. To that end, in various implementations, the data transmitter 244 includes instructions and/or logic therefor, and heuristics and metadata therefor.

In some implementations, the virtual renderer 246 is configured to generate (i.e., render), manage, and modify an XR environment presented to a user or virtual content associated therewith. In some implementations, virtual content comprises an XR environment. In some implementations, obtaining unmodified content includes one or more of receiving data or metadata from an external device, node, or server; retrieving data or metadata from a local memory or an external device, node or server; or generating data or metadata at a local device. In some implementations, virtual content includes one or more virtual objects, images, text, animations, of the like. In some implementations, the XR environment is a composite of a video feed of a physical environment with XR content. To that end, in various implementations, the virtual renderer 246 includes instructions and/or logic therefor, and heuristics and metadata therefor.

In some implementations, the simulation characteristic obtainer 400 is configured to obtain one or more simulation characteristics associated with simulating a display device having a first set of characteristics on a display device having a second set of characteristics. In some implementations, the one or more simulation characteristics includes one or more hardware characteristics, one or more user characteristics, and one or more environmental characteristics. To that end, in various implementations, the simulation characteristic obtainer 400 includes a hardware simulation engine 410, a user simulation engine 420, and an environment simulation engine 430.

In some implementations, the simulation modifier 248 is configured to modify, add, or remove one or more virtual or physical objects appearing within the viewable environment 100a. In some implementations, the simulation modifier 248 detects, isolates, compares, or identifies one or more virtual or physical objects within the viewable environment 100a. In some implementations, the simulation modifier 248 modifies a color, shape, texture, boundary, identifier, brightness, reflectivity, visual property, or like characteristic of one or more virtual or physical objects. In some implementations, the simulation modifier 248 provides information, notifications, alerts, or like communication regarding one or more simulation modifications or potential simulation modifications associated with the viewable environment 100a. To that end, in various implementations, the simulation modifier 248 includes instructions and/or logic therefor, and heuristics and metadata therefor.

In some implementations, the viewability engine 250 is configured to analyze and modify one or more virtual or physical objects appearing within the viewable environment 100a. In some implementations, the viewability engine 250 coordinates identification and management of interactions among virtual objects, physical objects, virtual environments, and physical environments within the viewable environment 100a. To that end, in various implementations, the viewability engine 250 includes a viewability analyzer 252 and a mitigation engine 254.

In some implementations, the viewability analyzer 252 is configured to generate a viewability metric associated with a foreground object and a background object appearing within the viewable environment 100a. In some implementations, the viewability analyzer 252 identifies at least one portion of at least one foreground object overlaid upon at least one portion of at least one background object. In some implementations, a foreground object comprises at least one virtual object, and a background object comprises at least one of a virtual object, a physical object, a virtual environment, and a physical environment within the viewable environment 100a. To that end, in various implementations, the viewability analyzer 252 includes instructions and/or logic therefor, and heuristics and metadata therefor.

In some implementations, the mitigation engine 254 is configured to modify one or more foreground or background objects appearing within the viewable environment 100a based on a viewability metric associated therewith. In some implementations, the mitigation engine 254 modifies at least one portion of one foreground object overlaid upon at least one portion of one background object. As one example, the mitigation engine 254 may apply an opaque background to a virtual object overlaid upon a background including a significant amount of distracting detail (i.e., a "busy" background). As another example, the mitigation engine 254 may apply an opaque background to a virtual object overlaid upon a background including rapidly changing colors or brightness (e.g., rapidly changing concert lighting or lights from vehicular traffic). To that end, in various implementations, the mitigation engine 254 includes instructions and/or logic therefor, and heuristics and metadata therefor.

Although the operating system 230 and the virtual experience engine 240 are shown as residing on a single device (e.g., the controller 110), it should be understood that in other implementations, any combination of the operating system 230 and the virtual experience engine 240 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
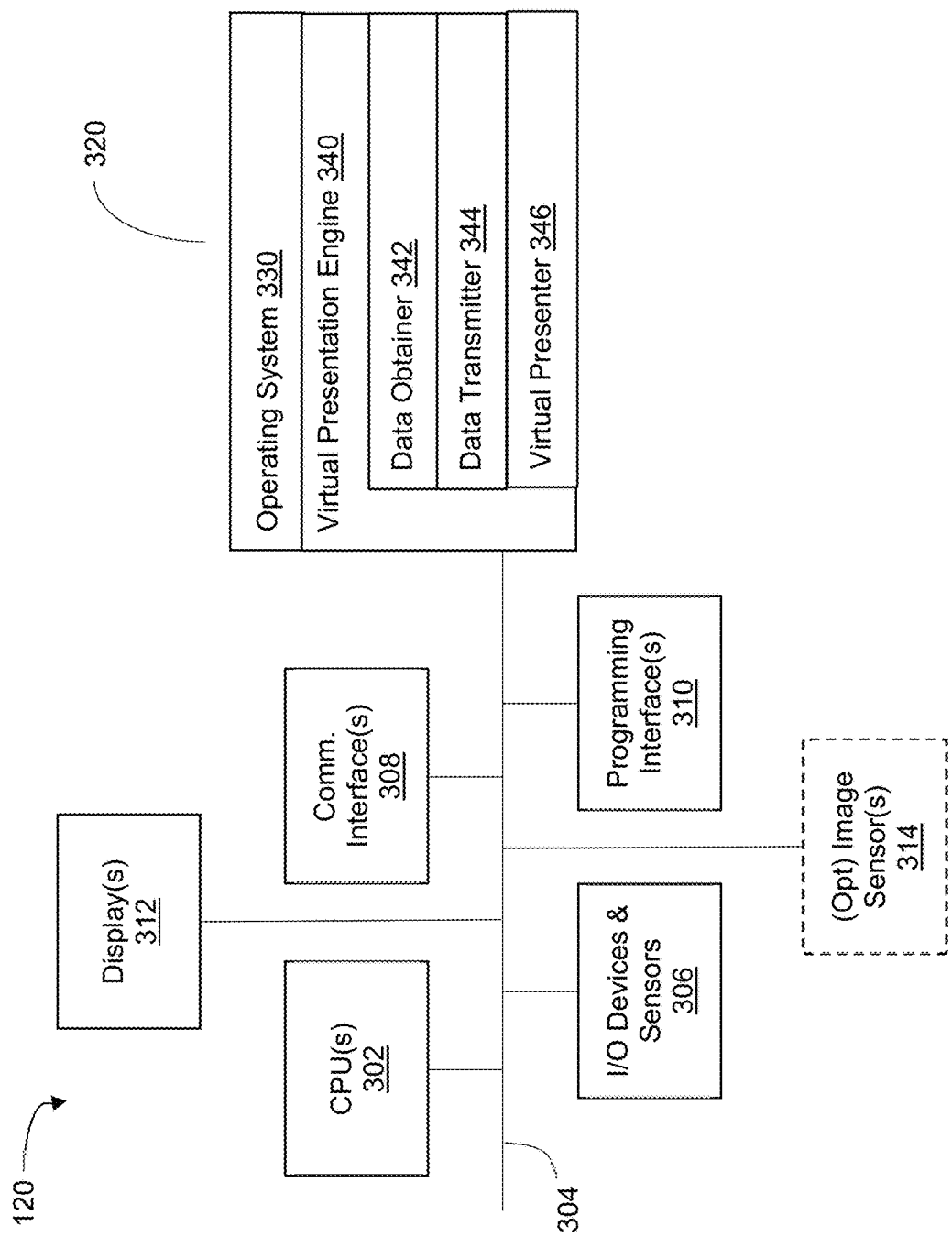
FIG. 3 is a block diagram of an example electronic device, in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine, a head pose tracking engine, a body pose tracking engine, a camera pose tracking engine, a hand/limb tracking engine, and/or the like. In some implementations, the electronic device 120 includes a natural language processing (NLP) engine for interpreting voice commands.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation engine 340.

The operating system 330 includes procedures for handling various basic system services and for performing hardware dependent tasks. To that end, in various implementations, the operating system 330 includes instructions and/or logic therefor, and heuristics and metadata therefor.

In some implementations, the virtual presentation engine 340 is configured to present and update XR content (e.g., the rendered image frames associated with the XR environment), including but not limited to information associated with, derived from, or otherwise in response to the one or more search results. In some implementations, the virtual presentation engine 340 may present one or more objects associated with the search results, or characteristics associated with the electronic device 120, the physical environment 105, or the user 150. In some implementations, the virtual presentation engine 340 may locate objects associated with one or more virtual or physical objects proximate to or overlaid upon a particular virtual or physical object within the viewable environment 100a of the electronic device 120a, including but not limited to virtual or physical people, avatars, limbs, plants, animals, furniture, natural or artificial structures, celestial objects, or the like. In some implementations, presenting may include outputting one or more of audio, video, haptic, or other user-perceptible medium. To that end, in various implementations, the virtual presentation engine 340 includes a data obtainer 342, a data transmitter 344, and a virtual presenter 346.

In some implementations, the data obtainer 342 is configured to obtain data (e.g., presentation data such as rendered image frames associated with the XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the data transmitter 344 is configured to transmit data (e.g., presentation data, location data, user interaction data, head tracking information, camera pose tracking information, eye tracking information, hand/limb tracking information, etc.) to at least the controller 110. To that end, in various implementations, the data transmitter 344 includes instructions and/or logic therefor, and heuristics and metadata therefor.

In some implementations, the virtual presenter 346 is configured to present and update virtual content (e.g., the rendered image frames associated with the XR environment) via the one or more displays 312. To that end, in various implementations, the virtual presenter 346 includes instructions and/or logic therefor, and heuristics and metadata therefor.

Although the operating system 330 and the virtual presentation engine 340 are shown as residing on a single device (e.g., the electronic device 120), it should be understood that in other implementations, any combination of the operating system 330 and the virtual presentation engine 340 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
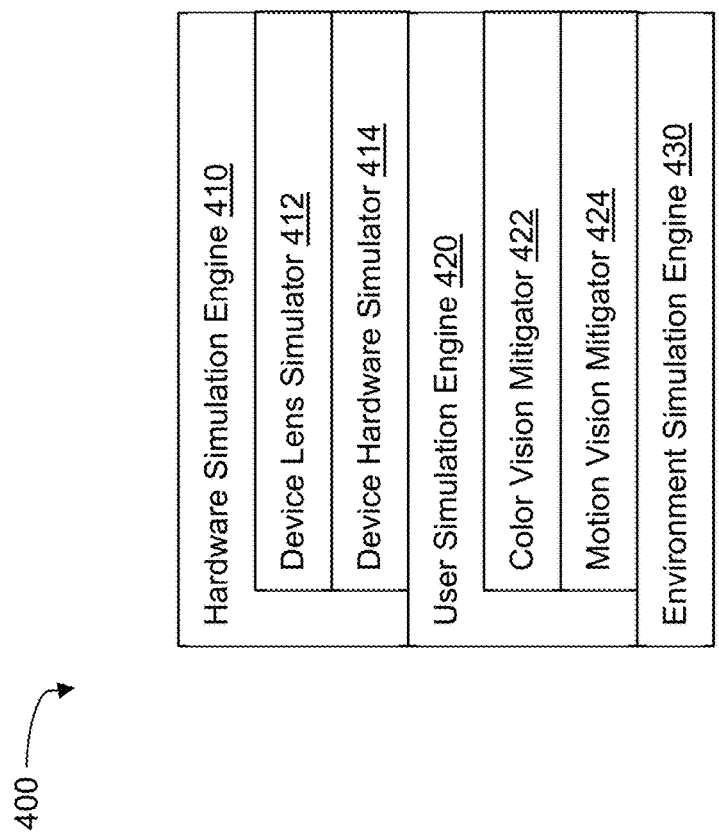
FIG. 4 is a block diagram of the simulation characteristic obtainer in FIG. 2 in accordance with some implementations.

FIG. 4 is a block diagram of an example electronic device including a simulation characteristic obtainer in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the hardware simulation engine 410 is configured to present, render, approximate, or otherwise provide a representation of one or more hardware characteristics. As one example, the hardware simulation engine 410 simulates an optical see-through display device on a video pass-through display device. In some implementations, the hardware simulation engine 410 simulates one or more aspects of material properties of a display device. In some implementations, the hardware simulation engine 410 simulates one or more aspects of display electronics or processing electronics of a display device. To that end, in various implementations, the hardware simulation engine 410 includes a device lens simulator 412 and a device hardware simulator 414.

In some implementations, the device lens simulator 412 is configured to present, render, approximate, or otherwise provide a representation of one or more hardware lens characteristics. In some implementations, optical see-through lens characteristics include characteristics of a transparent or semi-transparent surface on which visual content can be presented. The surface may be associated with a specific hardware device or a class of hardware devices. Lens characteristics include, but are not limited to, any one or more of polarization, opacity, color, tint, height, width, shape, curvature, index of refraction, any optical property, and the like. To that end, in various implementations, the device lens simulator 412 includes instructions and/or logic therefor, and heuristics and metadata therefor.

In some implementations, the device hardware simulator 414 is configured to present, render, approximate, or otherwise provide a representation of one or more device electronics characteristics. In some implementations, the device hardware simulator 414 simulates display electronics of a display device. In some implementations, display electronics and processing electronics comprise LED, OLED, or like display pixels, panels, or like structures and processors, non-transitory memories, and like structures associated therewith. To that end, in various implementations, the device hardware simulator 414 includes instructions and/or logic therefor, and heuristics and metadata therefor.

In some implementations, the user simulation engine 420 is configured to present, render, modify, or otherwise provide an XR environment in accordance with one or more user characteristics associated with a user of the electronic device 120. In some implementations, user characteristics comprise one or more of color sensitivity, light sensitivity, motion sensitivity, or the like. In some implementations, user sensitivity comprises a particular range of perceptibility of sensory input. In some implementations, user sensitivity comprises a particular range of perceptibility to a rate of change of sensory input. As one example, an epileptic sensitivity comprises a sensitivity to a particular rate of change of light perceived by a user. To that end, in various implementations, the user simulation engine 420 includes a color vision mitigator 422 and a motion vision mitigator 424.

In some implementations, the color vision mitigator 422 is configured to present, render, modify, or otherwise provide an XR environment in accordance with one or more color vision characteristics associated with a target user. In some implementations, color vision characteristics include color identification and replacement, color contrast or brightness modification, or the like. As one example, a color blindness sensitivity comprises a sensitivity to a particular band of frequencies associated with visible light. To that end, in various implementations, the color vision mitigator 422 includes instructions and/or logic therefor, and heuristics and metadata therefor.

In some implementations, the motion vision mitigator 424 is configured to present, render, modify, or otherwise provide an XR environment in accordance with one or more motion vision characteristics associated with a target user. In some implementations, motion vision characteristics include reduction of rate or magnitude of change in brightness, contrast, color or the like. To that end, in various implementations, the motion vision mitigator 424 includes instructions and/or logic therefor, and heuristics and metadata therefor.

In some implementations, the environment simulation engine 430 is configured to present, render, modify, or otherwise provide an XR environment in accordance with one or more environmental characteristics associated with physical environment 105 or viewable environment 100a. As one example, characteristics of a physical environment include movement of one or more background objects. As another example, characteristics of a physical environment include static or dynamic lighting conditions of at least one portion of the physical environment 105. To that end, in various implementations, the environment simulation engine 430 includes instructions and/or logic therefor, and heuristics and metadata therefor.

Moreover, FIG. 4 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 5A and 5B, 6A and 6B, 7A and 7B, 8A and 8B, 9A and 9B, 10A and 10B, 11A and 11B, 12A and 12B, and 13A and 13B illustrate nine distinct sequences of instances of an XR presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIGS. 5A and 5B, 6A and 6B, 7A and 7B, 8A and 8B, 9A and 9B, 10A and 10B, 11A and 11B, 12A and 12B, and 13A and 13B, an XR presentation scenario includes the electronic device 120. In some implementations, a portion of the physical environment 105 within the FOV 111 of the electronic device 120 includes at least one physical object 520, 620, 720, 820, 920, 1020, 1120, 1220, or 1320, and appears on the display 122 as a viewable physical object 530a and 530b, 630a and 630b, 730a and 730b, 830a and 830b, 930a and 930b, 1030a and 1030b, 1130a and 1130b, 1230a and 1230b, or 1330a and 1330b within the viewable environment 500a and 500b, 600a and 600b, 700a and 700b, 800a and 800b, 900a and 900b, 1000a and 1000b, 1100a and 1100b, 1200a and 1200b, or 1300a and 1300b. In some implementations, the viewable environment 500a and 500b, 600a and 600b, 700a and 700b, 800a and 800b, 900a and 900b, 1000a and 1000b, 1100a and 1100b, 1200a and 1200b, or 1300a and 1300b includes at least one virtual object 510, 610, 710a and 710b, 810a and 810b, 910a and 910b, 1010a and 1010b, 1110a and 1110b, 1210, or 1310. In some implementations, the display 122 comprises a video pass-through display device, and the electronic device presents the viewable environment 500a and 500b, 600a and 600b, 700a and 700b, 800a and 800b, 900a and 900b, 1000a and 1000b, 1100a and 1100b, 1200a and 1200b, or 1300a and 1300b on the video pass-through display. While FIGS. 5A and 5B, 6A and 6B, 7A and 7B, 8A and 8B, 9A and 9B, 10A and 10B, 11A and 11B, 12A and 12B, and 13A and 13B show a single physical object 520, 620, 720, 820, 920, 1020, 1120, 1220, or 1320, a single viewable physical object 530a and 530b, 630a and 630b, 730a and 730b, 830a and 830b, 930a and 930b, 1030a and 1030b, 1130a and 1130b, 1230a and 1230b, or 1330a and 1330b, and a single virtual object 510, 610, 710a and 710b, 810a and 810b, 910a and 910b, 1010a and 1010b, 1110a and 1110b, 1210, or 1310, those of ordinary skill in the art will appreciate from the present disclosure that a greater or lesser number of physical objects and virtual objects may be presented on the display 122.

As shown in FIG. 5A, the electronic device 120 presents the viewable environment 500a including the virtual object 510 and the viewable physical object 530a on the display 122, while operating in a non-simulation state prior to operating in a lens color simulation state. In some implementations, the viewable physical object 530a appears with substantial similarity to physical object 520 in the physical environment 105. In some implementations, the electronic device 120 presents the viewable environment 500a on the display 122 corresponding to video pass-through of the physical environment 105.

As shown in FIG. 5B, in response to changing operation to a lens color simulation state, the electronic device 120 presents the viewable environment 500b including the virtual object 510 and the viewable physical object 530b. In some implementations, in response to a lens color simulation state, the electronic device 120 modifies the viewable environment 500b and the viewable physical object 530b therein with a color simulation. In some implementations, a color simulation approximates or reproduces a visual effect of viewing an environment through one or more lenses of an optical see-through display having a particular color simulation characteristic. In some implementations, a color simulation characteristic comprises a material coloring or color property. In some implementations, a material coloring or color property comprises a brown, sepia, gray, green, white, blue or like lens color. In some implementations, a material coloring or color property comprises a reflective, anti-reflective, anti-scratch, or like lens treatment, coating, or type. In some implementations, the electronic device 120 forgoes applying the color simulation to the virtual object 510. As shown in FIGS. 5A and 5B, for example, the virtual object 510 does not change.

In some implementations, the electronic device 120 may present at least one viewability object 540. In some implementations, the viewability object 540 includes quantitative or qualitative information associated with one or more aspects of the lens color simulation. In some implementations, the viewability object 540 includes audio, video, text, augmented reality objects or events, virtual reality objects or events, or other similar static or dynamic content.

Figure 6A:
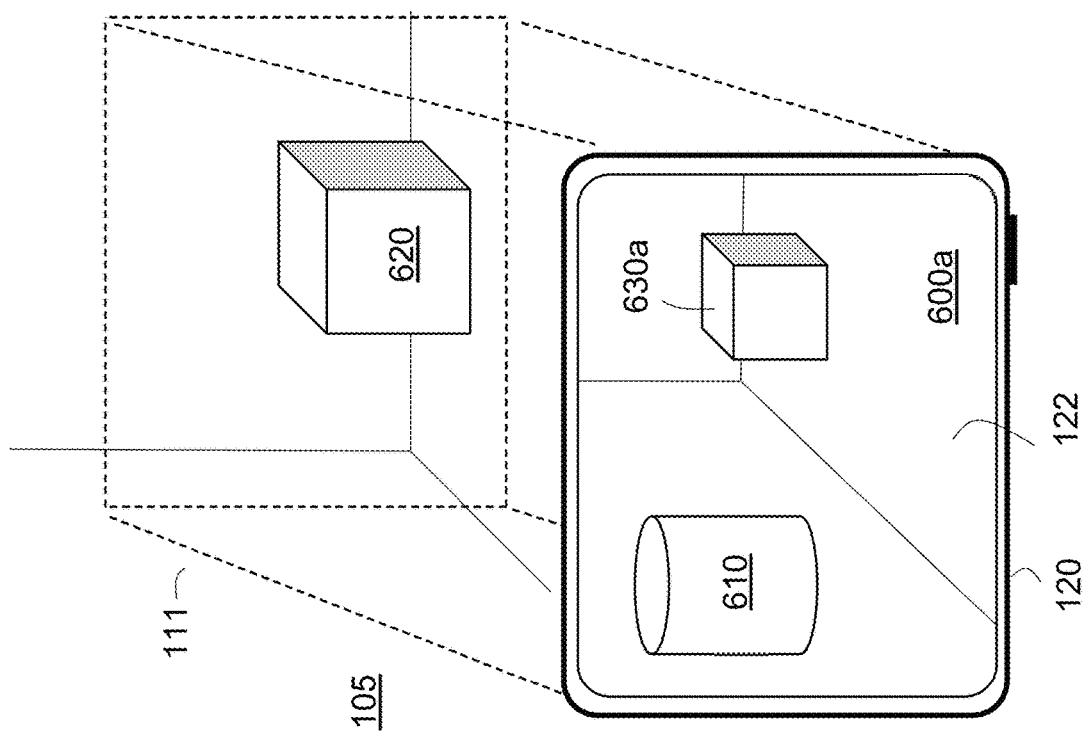

As shown in FIG. 6A, the electronic device 120 presents the viewable environment 600a including the virtual object 610 and the viewable physical object 630a on the display 122, while operating in a non-simulation state prior to operating in a lens polarization simulation state. In some implementations, the viewable physical object 630a appears with substantial similarity to physical object 620 in the physical environment 105. In some implementations, the electronic device 120 presents the viewable environment 600a on the display 122 corresponding to video pass-through of the physical environment 105. In some implementations, optical see-through lens characteristics include characteristics of a transparent or semi-transparent surface on which visual content can be presented. The surface may be associated with a specific hardware device or a class of hardware devices. Lens characteristics include, but are not limited to, any one or more of polarization, opacity, color, tint, height, width, shape, curvature, index of refraction, and any optical property.

As shown in FIG. 6B, in response to changing operation to a lens polarization simulation state, the electronic device 120 presents the viewable environment 600b including the virtual object 610 and the viewable physical object 630b. In some implementations, in response to a lens polarization simulation state, the electronic device 120 modifies the viewable environment 600b and the viewable physical object 630b therein with a lens polarization simulation. In some implementations, a lens polarization simulation approximates or reproduces a visual effect of viewing an environment through one or more polarized lenses of an optical see-through display. In some implementations, a lens polarization simulation is associated with a polarization reference angle defining a lens polarization orientation with respect to a horizontal line, vertical line, or a line at any other angle through a plane of presentation of the first XR environment. In some implementations, modifying the first XR environment comprises varying brightness, contrast, or like characteristic of the first XR environment based on a difference between the polarization reference angle and an environment reference angle. In some implementations, the environment reference angle may be a horizontal line, a vertical line, or a line at any other angle through a plane of presentation of the first XR environment. In some implementations, modifying the first XR environment may vary in accordance with a magnitude of the difference between the polarization reference angle and the environment reference angle.

In some implementations, the electronic device 120 may present at least one viewability object 640. In some implementations, the viewability object 640 includes quantitative or qualitative information associated with one or more aspects of the lens polarization simulation. In some implementations, the viewability object 640 includes audio, video, text, augmented reality objects or events, virtual reality objects or events, or other similar static or dynamic content. As shown in FIGS. 6A and 6B, for example, the virtual object 610 does not change.

In some implementations, a curvature simulation approximates or reproduces a visual effect of viewing an environment through one or more curved lenses of an optical see-through display. In some implementations, a viewport associated with the first XR environment is a simulated or virtual object that approximates or reproduces a shape of a lens of an optical see-through display. In some implementations, a curvature simulation characteristic is associated with a focal length of the viewport. In some implementations, a curvature simulation characteristic is associated with a radius of curvature of the viewport.

Figure 7A:
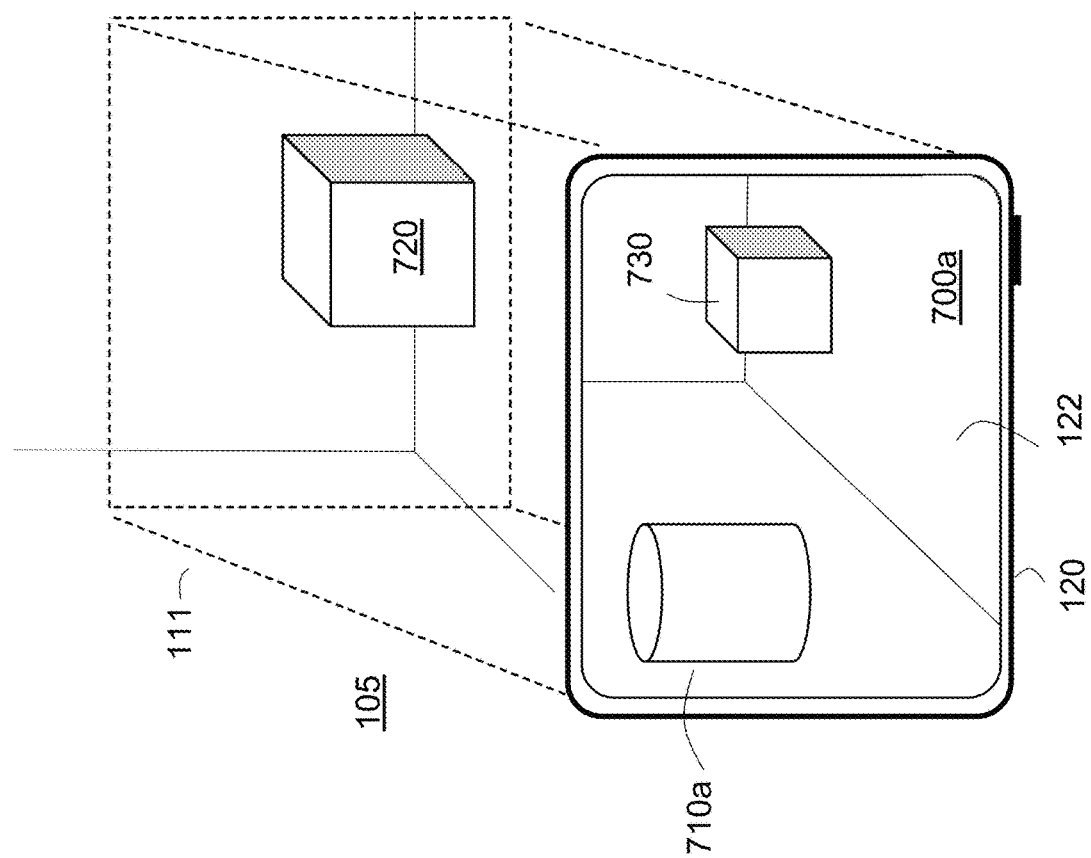
FIGS. 7A and 7B illustrate a sequence of instances for emulating an optical see-through display device on a video pass-through display device based on device electronics characteristics, in accordance with some implementations.

As shown in FIG. 7A, the electronic device 120 presents the viewable environment 700a including the virtual object 710a and the viewable physical object 730 on the display 122, while operating in a non-simulation state prior to operating in a hardware simulation state based on one or more device characteristics. In some implementations, the viewable physical object 730 appears with substantial similarity to physical object 720 in the physical environment 105. In some implementations, device characteristics include characteristics of a digital or additive display associated with an optical see-through device, on which visual content can be projected or presented. The characteristics of the digital display include, but are not limited to, any one or more of height in pixels, width in pixels, renderable area in pixels, refresh rate, refresh type, pixel field arrangement, color profile or property, stereoscopic synchronization, noise, static, interference, wireless lag, and any electrical or electronic property of a hardware device in normal, fault, emergency, and unusual operations of the hardware device or a system associated with the hardware device. In some implementations, the viewable physical object 730 appears with substantial similarity to physical object 720. In some implementations, the electronic device 120 presents the viewable environment 700a on the display 122 corresponding to video pass-through of the physical environment 105.

Figure 7B:
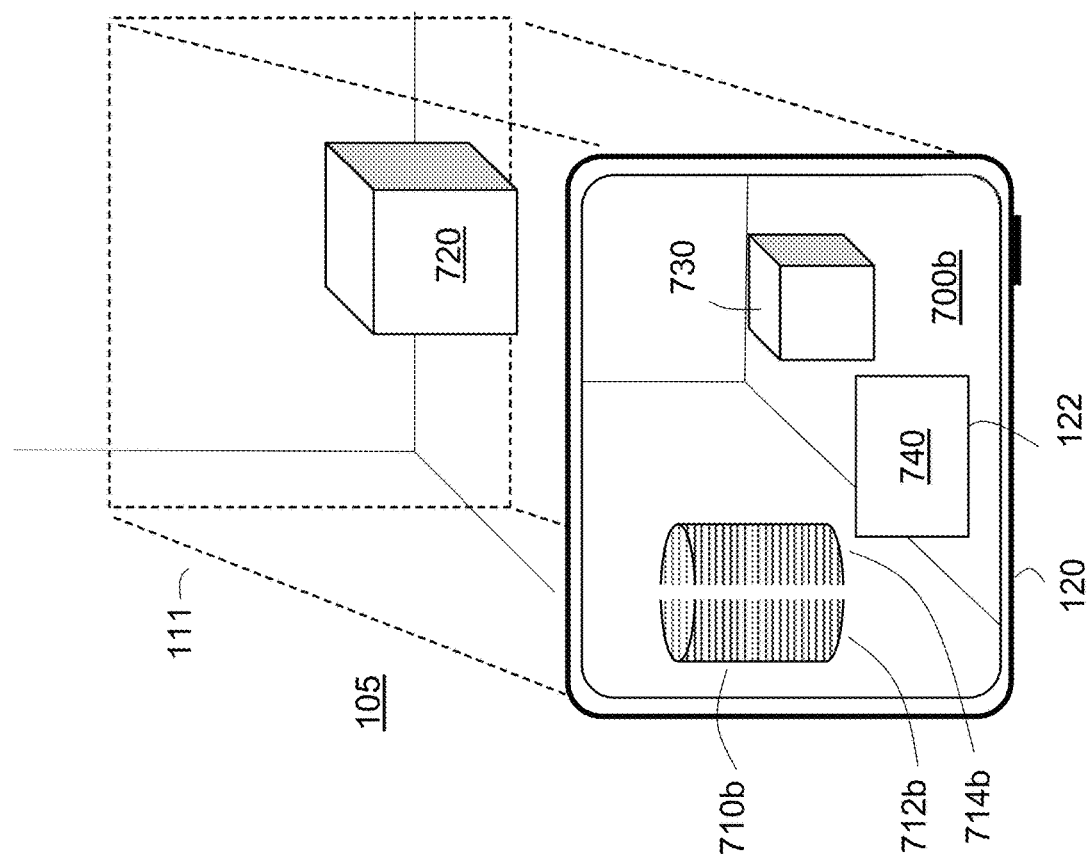

As shown in FIG. 7B, in response to changing operation to a hardware simulation state, the electronic device 120 presents the viewable environment 700b including the virtual object 710b and the viewable physical object 730. In some implementations, the virtual object 710b includes a refresh rate simulation that approximates or reproduces a visual effect of a display device having a particular refresh rate simulation characteristic. In some implementations, a refresh rate simulation characteristic comprises a frequency in Hertz (Hz) at which a display device presents at least a portion of the XR environment. In some implementations, the electronic device 120 presents the refresh rate simulation as a pixelated or scan-line effect associated with the virtual object 710b.

In some implementations, the virtual object 710b includes a refresh type simulation that approximates or reproduces a visual effect of an optical see-through display having a particular refresh type simulation characteristic. In some implementations, a refresh type simulation characteristic comprises an interlaced or noninterlaced display refresh type. In some implementations, a refresh type simulation characteristic comprises a refresh delay associated with wireless lag or other signal delay from any external source. In some implementations, a refresh type simulation characteristic comprises a synchronization delay associated with stereoscopic display synchronization, local hardware or bus speed lag, or other signal delay from any internal source. In some implementations, a refresh type comprises independently refreshing one or more portions, panels, or groups of pixels of the first XR environment. In some implementations, the electronic device 120 presents the refresh rate simulation as a first rendered region 712b of the virtual object 710b separated from a second rendered region 714b of the virtual object 710b. In some implementations, one or more of the rendered regions 712b and 714b are associated with groups, panels or the like comprising a set of pixels or lines of a display device.

In some implementations, the electronic device 120 may present at least one viewability object 740. In some implementations, the viewability object 740 includes quantitative or qualitative information associated with one or more aspects of the hardware simulation. In some implementations, the viewability object 740 includes audio, video, text, augmented reality objects or events, virtual reality objects or events, or other similar static or dynamic content.

As shown in FIG. 8A, the electronic device 120 presents the viewable environment 800a including the virtual object 810a and the viewable physical object 830a on the display 122, while operating in a non-simulation state prior to operating in a user vision simulation state. In some implementations, the viewable physical object 830a appears with substantial similarity to physical object 820 in the physical environment 105. In some implementations, the virtual object 810a, the physical object 820, and the viewable physical object 830a share a particular color, color property, color family, rate of color change, rate of brightness change, rate of contrast change, object motion, or like visual property associated with one or more characteristics of visual perception. In some implementations, characteristics of visual perception include, but are not limited to, any one or more of astigmatism, nearsightedness, farsightedness, lens flexibility, blind spots, colorblindness, epilepsy, any optical characteristic of a biological eye, and any biological, medical, neurological or like characteristic of human vision perception.

Figure 8B:
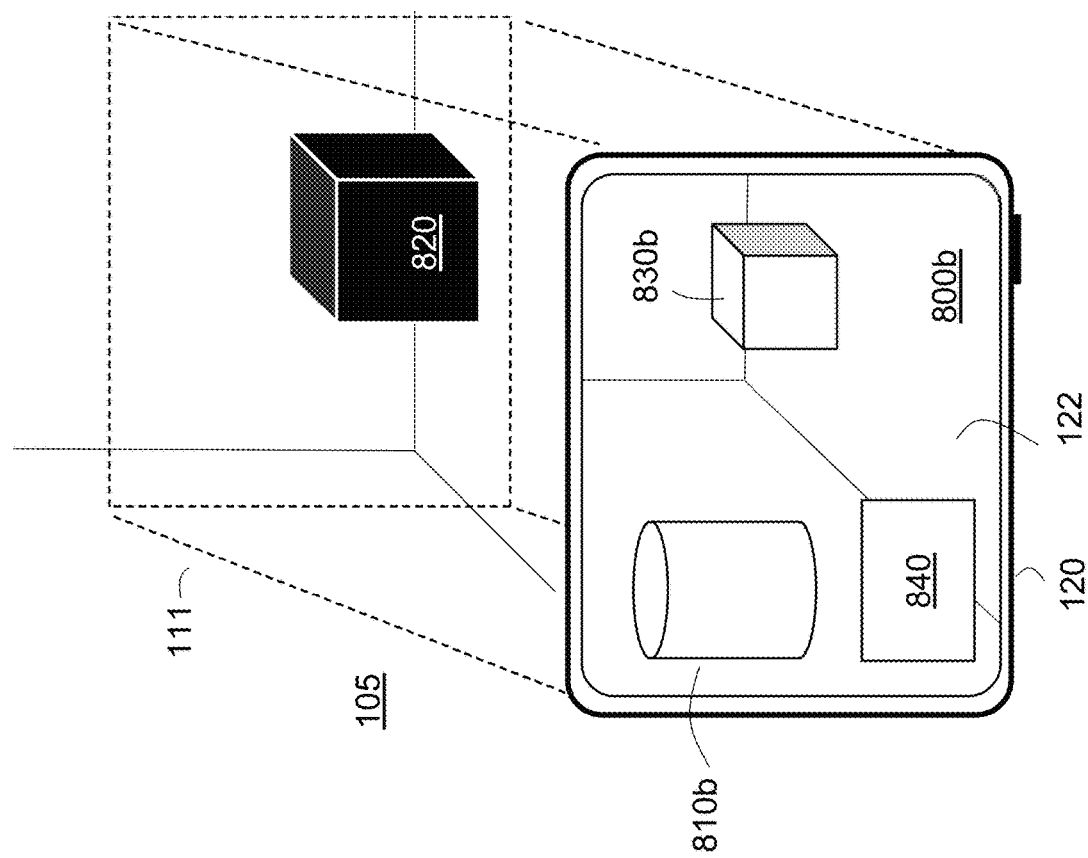

As shown in FIG. 8B, in response to changing operation to a user vision simulation state, the electronic device 120 presents the viewable environment 800b including the virtual object 810b and the viewable physical object 830b based on a colorblindness characteristic, an epilepsy characteristic, or the like. In some implementations, a colorblindness characteristic comprises a designation that a particular user has a colorblindness condition. In some implementations, a colorblindness condition is one of red/green colorblindness, yellow/blue colorblindness, and total colorblindness. In some implementations, replacing one or more colors comprises replacing or modifying at least one of red or green with another color to mitigate red-green colorblindness, replacing or modifying at least one of yellow or blue to mitigate yellow/blue colorblindness, or replacing or modifying one or more colors with one or more high-contrast grayscale colors to mitigate total colorblindness. In some implementations, a photosensitive epilepsy characteristic comprises a designation that a particular user has a photosensitive epilepsy condition. In some implementations, limiting a change in brightness comprises setting a maximum delta of permissible brightness between a current pixel, region, or entirety of the first XR environment and at least one immediately following pixel, region, or entirety of the first XR environment. In some implementations, limiting the change in brightness comprises setting a maximum delta of permissible brightness as discussed above, for a particular period of time subsequent to the obtaining of the first XR environment. In some implementations, the electronic device 120 presents the virtual object 810b and the viewable physical object 830b with color characteristics in accordance with a user color simulation state. For example, a user color simulation state may replace one or both of red and green colors to mitigate red-green colorblindness effects, and may replace one or more high contrast or brightness properties, or rate of change thereof, to mitigate an epilepsy trigger condition in a user.

In some implementations, a user vision simulation state is based on a blind spot characteristic. In some implementations, a blind spot characteristic comprises a designation that a particular user has a blind spot condition in a particular position within the user's field of view. In some implementations, a user identifies a designated blind spot within the user's field of field of the first XR environment where the user is unable to effectively perceive the visual environment. In some implementations, moving at least a portion of the first XR environment within the designated blind spot comprises presenting the portion of the first XR environment within the designated blind spot onto a different location within the second XR environment, or presenting the portion of the first XR environment within the designated blind spot adjacent to or around the blind spot.

In some implementations, the electronic device 120 may present at least one viewability object 840. In some implementations, the viewability object 840 includes quantitative or qualitative information associated with one or more aspects of the user vision simulation. In some implementations, the viewability object 840 includes audio, video, text, augmented reality objects or events, virtual reality objects or events, or other similar static or dynamic content.

Figure 9A:
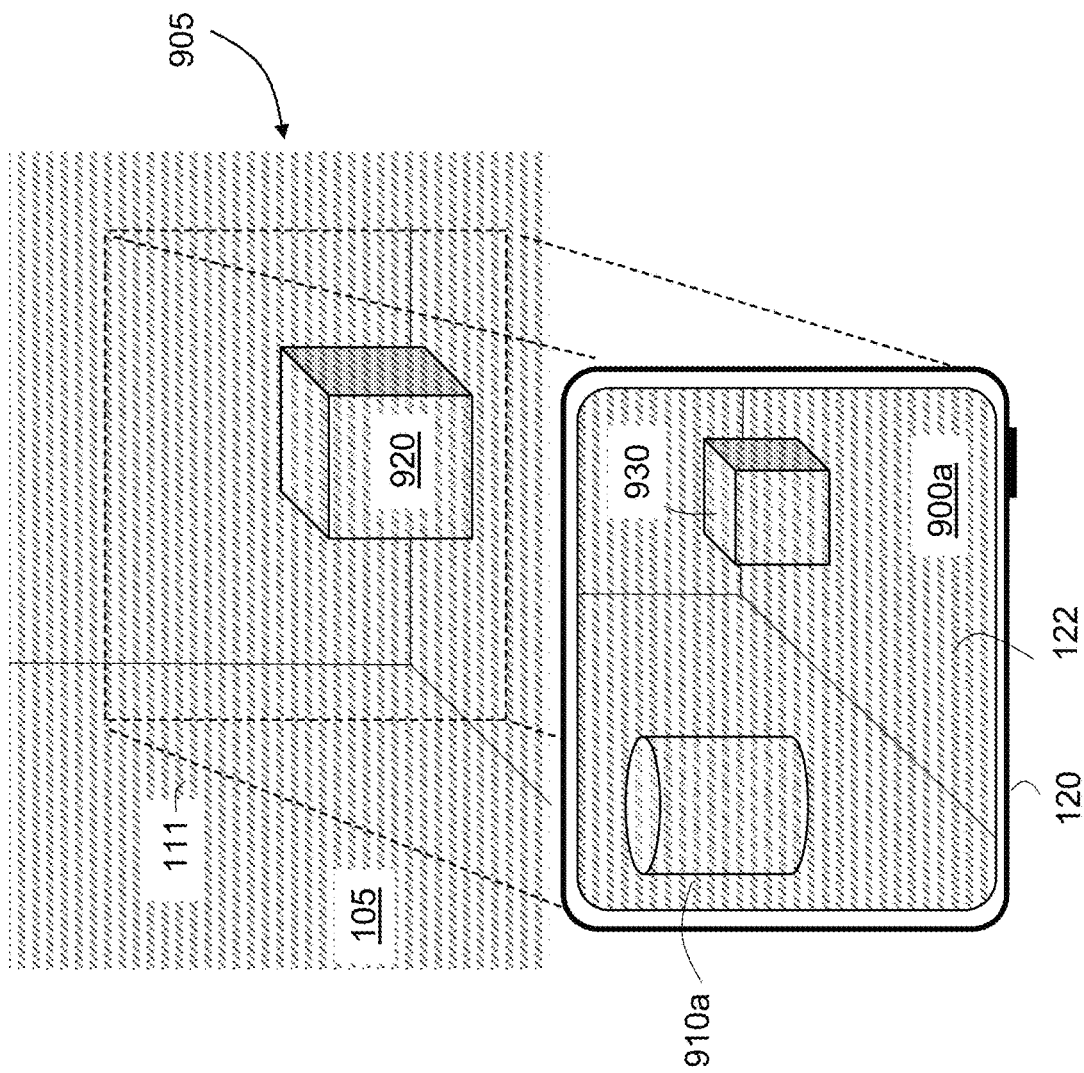
FIGS. 9A and 9B illustrate a sequence of instances for modifying virtual content based on environment characteristics, in accordance with some implementations.

As shown in FIG. 9A, the electronic device 120 presents the viewable environment 900a including the virtual object 910a and the viewable physical object 930 on the display 122, while operating in a non-simulation state prior to operating in an environment mitigation simulation state. In some implementations, the physical environment 105 within the FOV 111 includes an environment state 905 perceptible within the viewable environment 900a and including one or more environment characteristics. In some implementations, the viewable physical object 930 appears with substantial similarity to physical object 920 in the physical environment 105 and including one or more visual properties associated with the environment state 905. In some implementations, the one or more environment characteristics include characteristics of an environment in which a user, device or system associated with a user or device may operate. Environment characteristics include, but are not limited to, a scene or portion of a scene with particular brightness, contrast, color, movement, or any visual property or imagery. Environment characteristics may include imagery associated with particular environmental conditions, including, but not limited to, rain, snow, bright or direct sunlight, low light, shadows, glare, sudden darkness, sudden brightness, fast movement, flashing lights, or any visual property or imagery. In some implementations, environment characteristics may be incorporated into or appear in prerecorded or live imagery of a scene or part of a scene. In some implementations, a scene may include at least one of a forest, leaves, city lights at night, traffic, one or more persons, one or more animals, or any real or virtual representation of a physical environment.

Figure 9B:
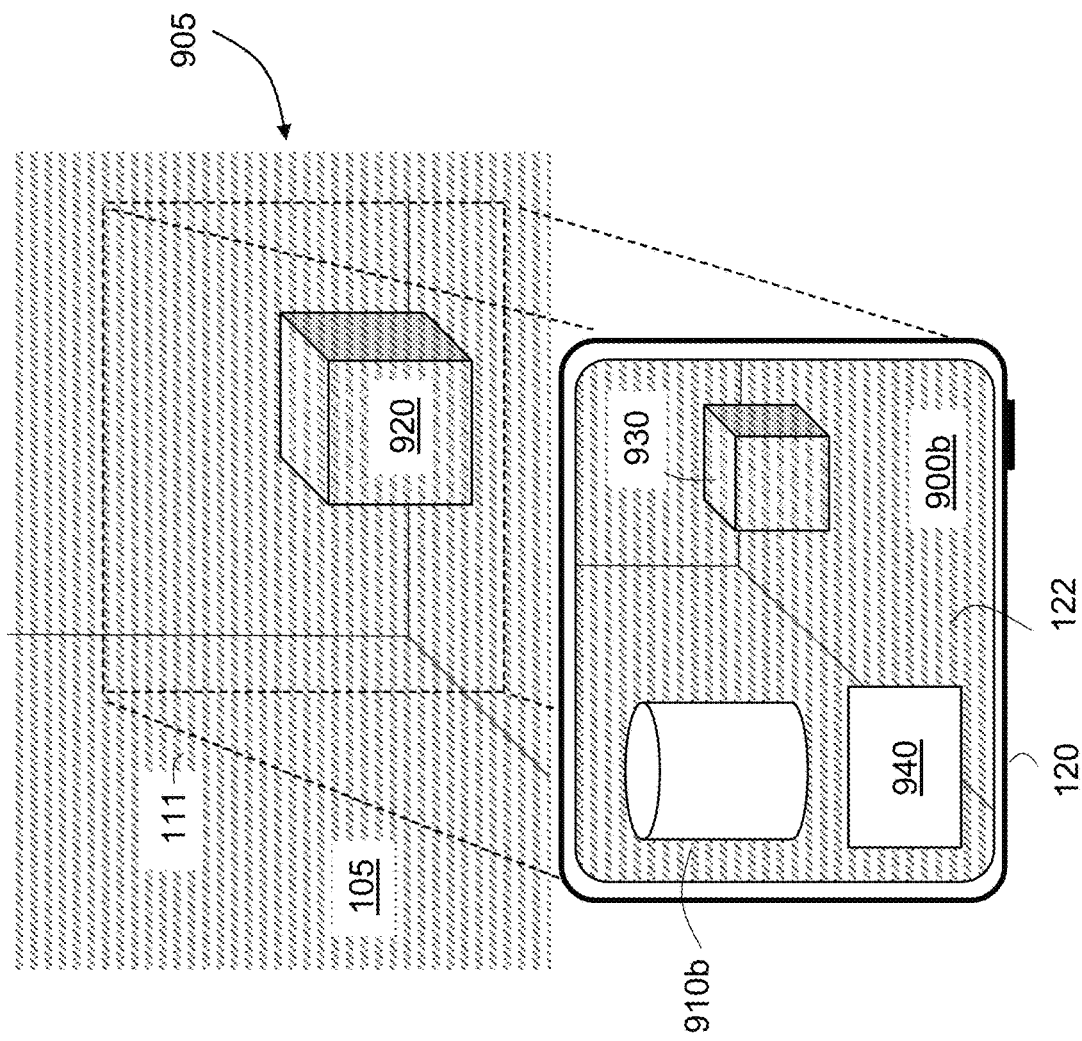

As shown in FIG. 9B, in response to changing operation to an environment mitigation simulation state, the electronic device 120 presents the viewable environment 900b including the virtual object 910b and the viewable physical object 930. In some implementations, the electronic device 120 presents the virtual object 910b without any or substantial effect from the environment state 905. In some implementations, the environment mitigation simulation state comprises a virtual opacity effect to eliminate or substantially reduce interference or the like between the virtual object 910b and the environment state 905 within the viewable environment 900b.

In some implementations, the electronic device 120 may present at least one viewability object 940. In some implementations, the viewability object 940 includes quantitative or qualitative information associated with one or more aspects of the environment mitigation simulation. In some implementations, the viewability object 940 includes audio, video, text, augmented reality objects or events, virtual reality objects or events, or other similar static or dynamic content.

As shown in FIG. 10A, the electronic device 120 presents the viewable environment 1000a including the virtual object 1010a and the viewable physical object 1030a on the display 122, while operating in a non-simulation state prior to operating in an environment enhancement simulation state. In some implementations, the physical environment 105 within the FOV 111 includes an environment state 1005 perceptible within the viewable environment 1000a and including one or more environment characteristics. In some implementations, the viewable physical object 1030a appears with substantial similarity to physical object 1020 and including one or more visual properties associated with the environment state 1005. In some implementations, the environment state 1005 includes physical conditions with low effect on user visibility. As one example, the environment state 1005 may include a sunny outdoor environment with no precipitation or few clouds. As another example, the environment state 1005 may include a well-lit indoor space or room.

Figure 10B:
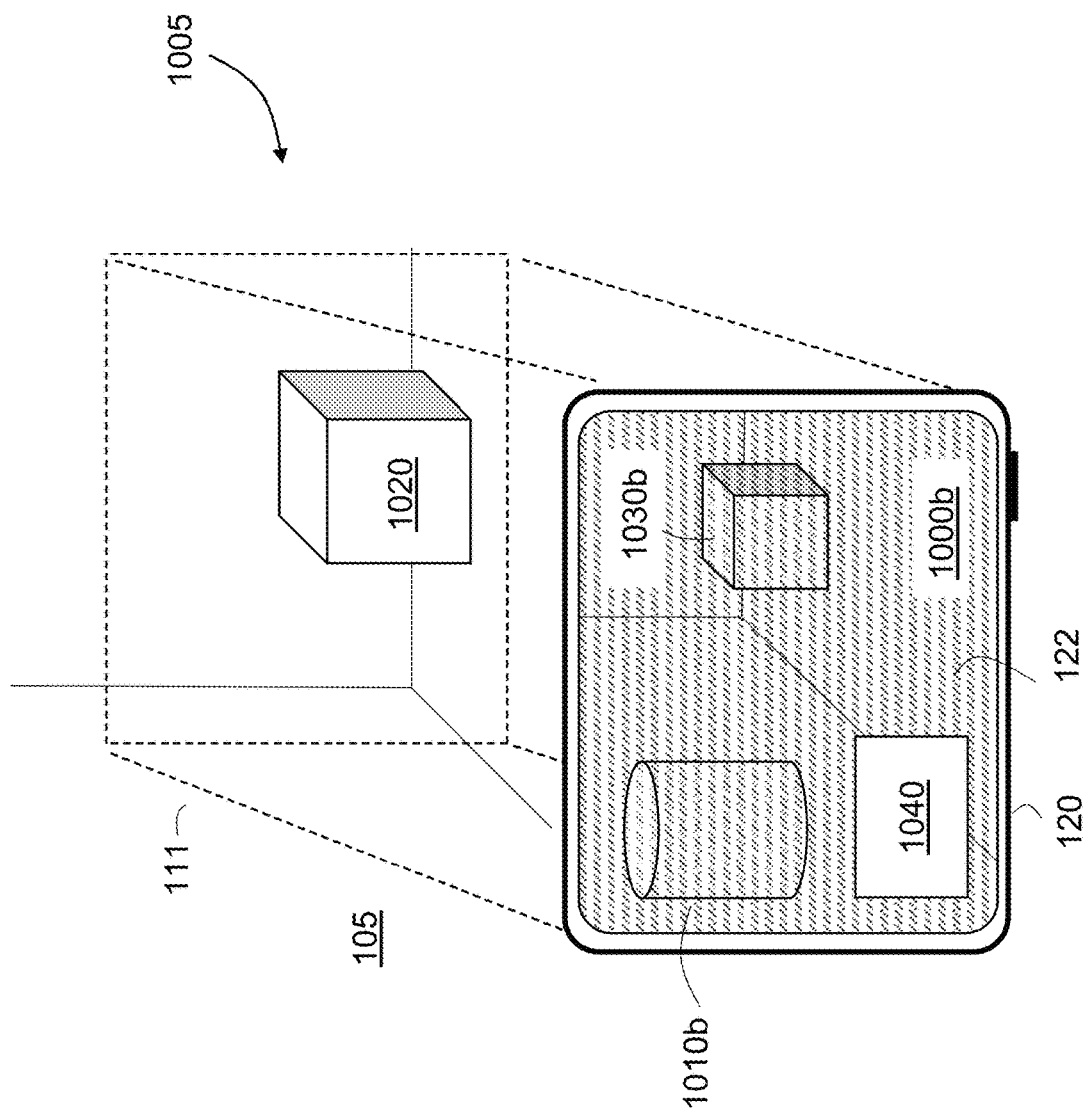

As shown in FIG. 10B, in response to changing operation to an environment enhancement simulation state, the electronic device presents the viewable environment 1000b including the virtual object 1010b and the viewable physical object 1030b. In some implementations, the electronic device 120 presents the virtual object 1010b including at least one virtual environment state distinct from the environment state 1005. In some implementations, the environment enhancement simulation state comprises a virtual overlay effect to generate or amplify at least one environmental condition, effect, attribute or the like between the virtual object 1010b or the viewable physical object 1030b and the viewable environment 1000b including the virtual environment state. In some implementations, the virtual environment state comprises a virtual precipitation, lighting, motion, or like modification to the environment state 1005.

Figure 11A:
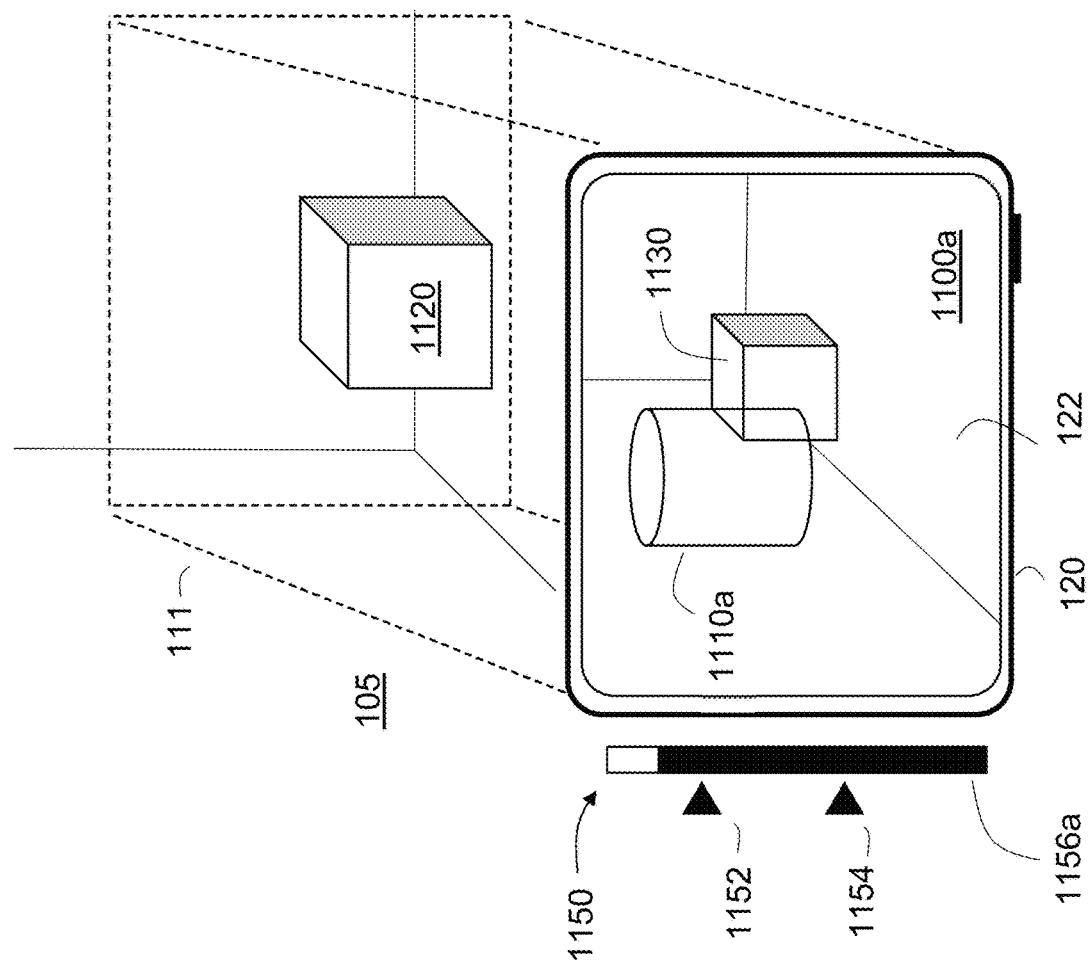
FIGS. 11A and 11B illustrate a sequence of instances for improving user perception of virtual content based on satisfaction of a critical viewability threshold, in accordance with some implementations.

As shown in FIG. 11A, the electronic device 120 presents the unmodified viewable environment 1100a including the unmodified virtual object 1110a and the viewable physical object 1130 on the display 122. In some implementations, the electronic device 120 obtains a viewability metric range 1150, a critical viewability threshold 1152, and a recommended viewability threshold 1154. As one example, the critical viewability threshold 1152 indicates that relative brightness or contrast levels make difficult the viewing of the foreground object against the background object. As one example, the recommended viewability threshold 1154 indicates that viewability of a foreground object relative to a background object is impaired below a critical viewability threshold 1152 requiring a change to a foreground object to mitigate viewability difficulty. In some implementations, the unmodified virtual object 1110a is at least partially proximate to or overlaid upon the viewable physical object 1130, and the unmodified virtual object 1110a comprises a transparent fill and a low-viewability wireframe. In some implementations, the unmodified virtual object 1110a is a foreground object and the viewable physical object 1130 is a background object. In some implementations, the visual property is an editable feature of the foreground object and may be changed to increase viewability of the foreground object with respect to the background object. For example, the visual property may be a specific color of text or outline of text, a specific color, texture or transparency of a background layer of text or imagery distinguishing the foreground object from the background object. In some implementations, the location of a foreground object may be over or proximate to a particular portion of a background object affecting difficulty of viewability. For example, a foreground object may be placed above a high contrast or "busy" background including either bright green leaves in shadow, or bright city lights at night. A location of the foreground object may be over or proximate to a region or portion of a background object having a high or relatively low visual property relative to another region or portion of the background object or another background object (e.g., a daytime outdoor background with relatively higher brightness than a nighttime outdoor background).

Figure 11B:
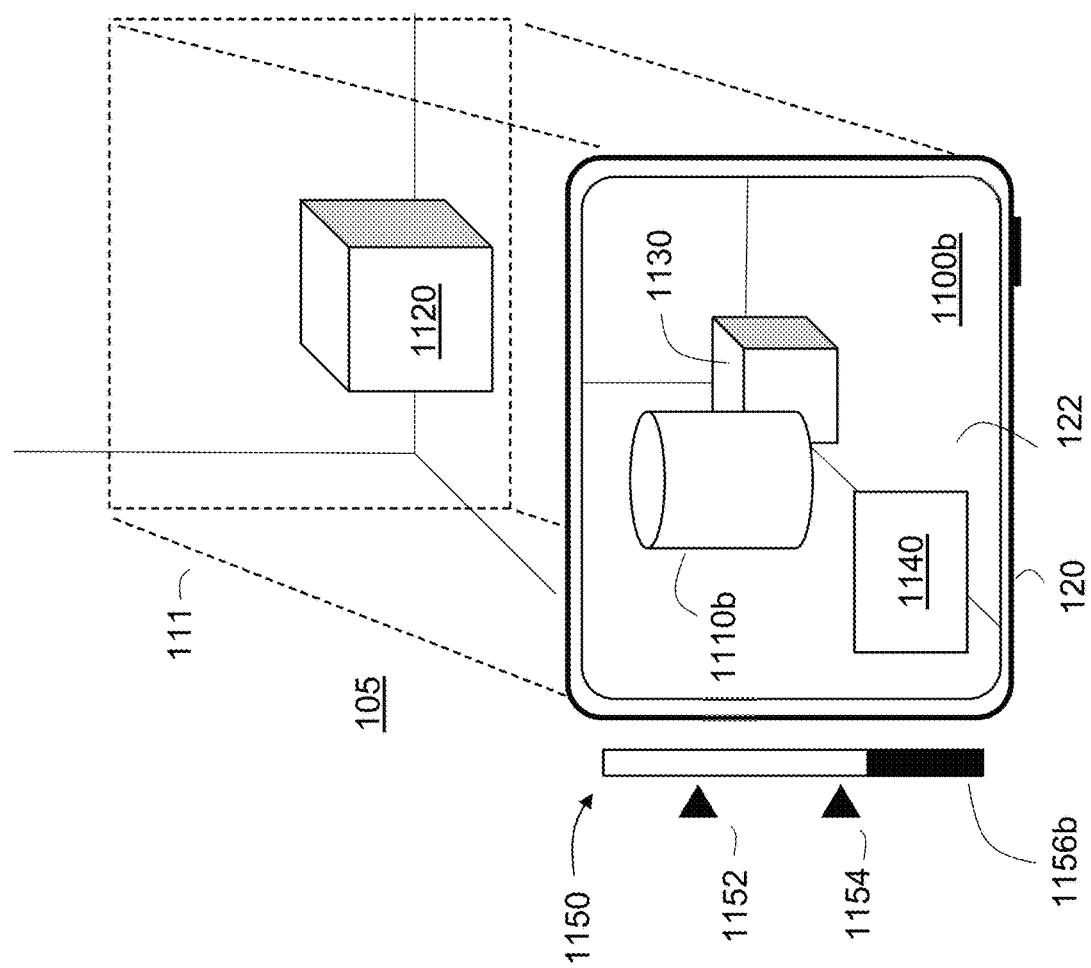

As shown in FIG. 11B, in response to a determination that the first viewability metric 1156a exceeds the critical viewability threshold 1152, the electronic device 120 obtains (e.g., receives, retrieve, or generates) a modified viewable environment 1100*b* including a modified virtual object 1110*b*. In some implementations, the electronic device 120 obtains a first viewability metric 1156*a* based on the unmodified virtual environment 1100*a* including the unmodified virtual object 1110*a* and the viewable physical object 1130. In some implementations, a device presents a foreground object with one or more characteristics modified to enhance viewability of the foreground object with respect to a portion of the background object proximate to or below the foreground object. In some implementations, the device presents information relevant to the modification. Information relevant to the modification may include, but is not limited to, color, transparency, luminosity, sharpness or chromatic characteristic of the visual content. In some implementations, a critical viewability threshold represents a value, range, or condition in which viewing a foreground object and a background object with a particular viewability metric materially reduces a predetermined user's ability to view a foreground object. A material reduction in viewability includes, but is not limited to, lack of contrast between objects, high interference from brightness, color or transparency, or difficulty in viewing an object proximate to particular patterns of static or changing color, light, or shape. In some implementations, the modified virtual object 1110*b* comprises an opaque fill, a low-viewability wireframe, and a second viewability metric 1156*b* lower than the critical viewability threshold 1152 and the recommended viewability threshold 1154.

In some implementations, the electronic device 120 may present at least one viewability object 1140. In some implementations, the viewability object 1140 includes quantitative or qualitative information associated with one or more aspects of modified virtual object 1110*b* or the modified viewable environment 1100*b*. In some implementations, the viewability object 1140 includes audio, video, text, augmented reality objects or events, virtual reality objects or events, or other similar static or dynamic content.

Figure 12A:
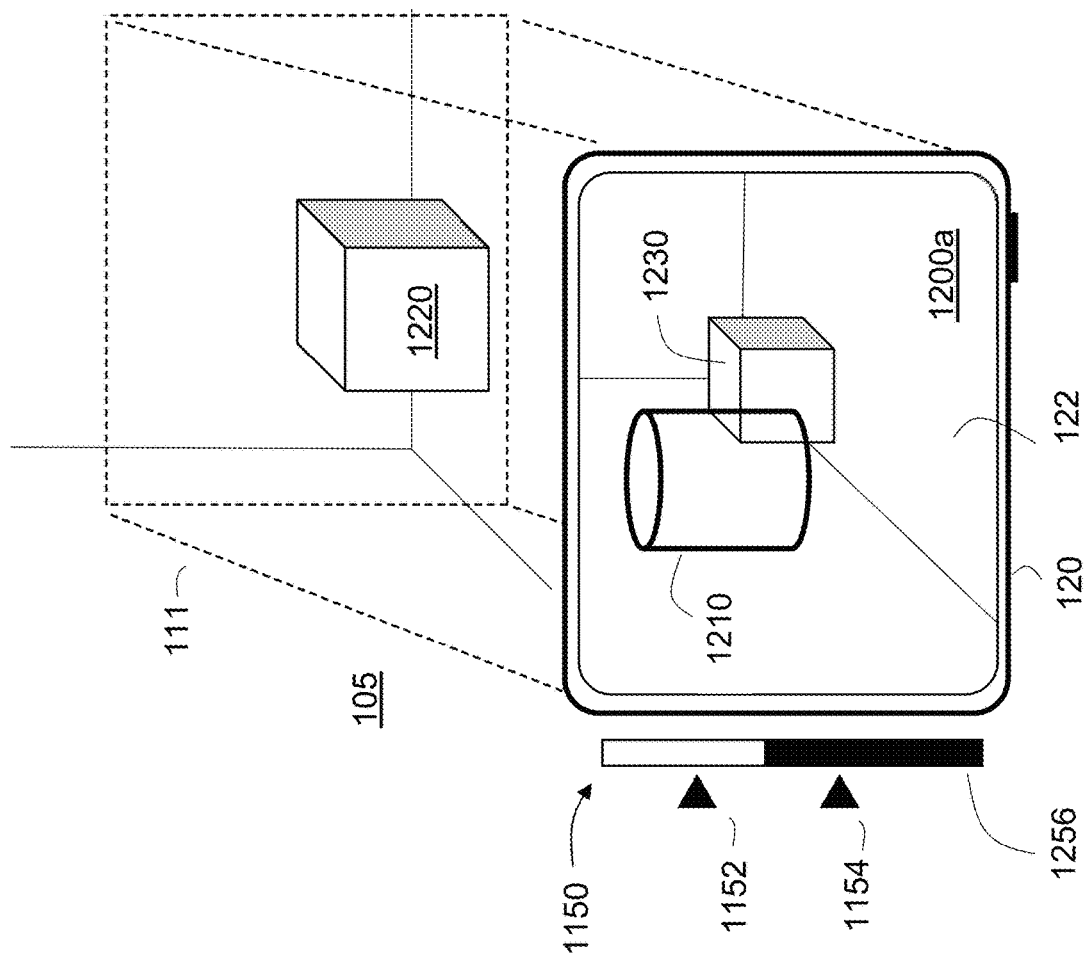

As shown in FIG. 12A, the electronic device 120 presents the unmodified viewable environment 1200*a* including the unmodified virtual object 1210*a* and the viewable physical object 1230 on the display 122. In some implementations, the unmodified virtual object 1210*a* is at least partially proximate to or overlaid upon the viewable physical object 1230, and the unmodified virtual object 1210*a* comprises a transparent fill and a high-viewability wireframe. In some implementations, the unmodified virtual object 1210*a* is a foreground object and the viewable physical object 1230 is a background object. In some implementations, the electronic device 120 obtains a viewability metric 1256 based on the unmodified virtual environment 1200*a* including the unmodified virtual object 1210*a* and the viewable physical object 1230.

As shown in FIG. 12B, in response to a determination that the viewability metric 1256 exceeds the recommended viewability threshold 1154 and does not exceed the critical viewability threshold 1152, the electronic device 120 obtains (e.g., receives, retrieve, or generates) a modified viewable environment 1200*b* including an unmodified virtual object 1210*b* and a viewability modification object 1260. In some implementations, the viewability modification object 1260 identifies a foreground object or a visual property of a foreground object. As one example, the viewability modification object 1260 may include a border drawn around an object, text associated with an object, shading or coloration of an object or portion of the object having a particular contrast level satisfying the recommended viewability threshold. In some implementations, the modified virtual environment 1200*b* includes the unmodified virtual object 1210 and the viewability modification object 1260 to identify potentially modifiable virtual objects that do not present a critical challenge to viewability within the viewable environment 1200*b*.

In some implementations, the electronic device 120 may present at least one viewability object 1240. In some implementations, the viewability object 1240 includes quantitative or qualitative information associated with one or more aspects of the unmodified virtual object 1210*b* or the modified viewable environment 1200*b*. In some implementations, the viewability object 1240 includes audio, video, text, augmented reality objects or events, virtual reality objects or events, or other similar static or dynamic content.

As shown in FIG. 13A, the electronic device 120 presents the unmodified viewable environment 1300*a* including the unmodified virtual object 1310 and the viewable physical object 1330 on the display 122. In some implementations, the unmodified virtual object 1310 is at least partially proximate to or overlaid upon the viewable physical object 1330, and the unmodified virtual object 1310 comprises an opaque fill and a high-viewability wireframe. In some implementations, the unmodified virtual object 1310 is a foreground object and the viewable physical object 1330 is a background object. In some implementations, the electronic device 120 obtains a viewability metric 1356 based on the unmodified virtual environment 1300*a* including the unmodified virtual object 1310 and the viewable physical object 1330.

Figure 13B:
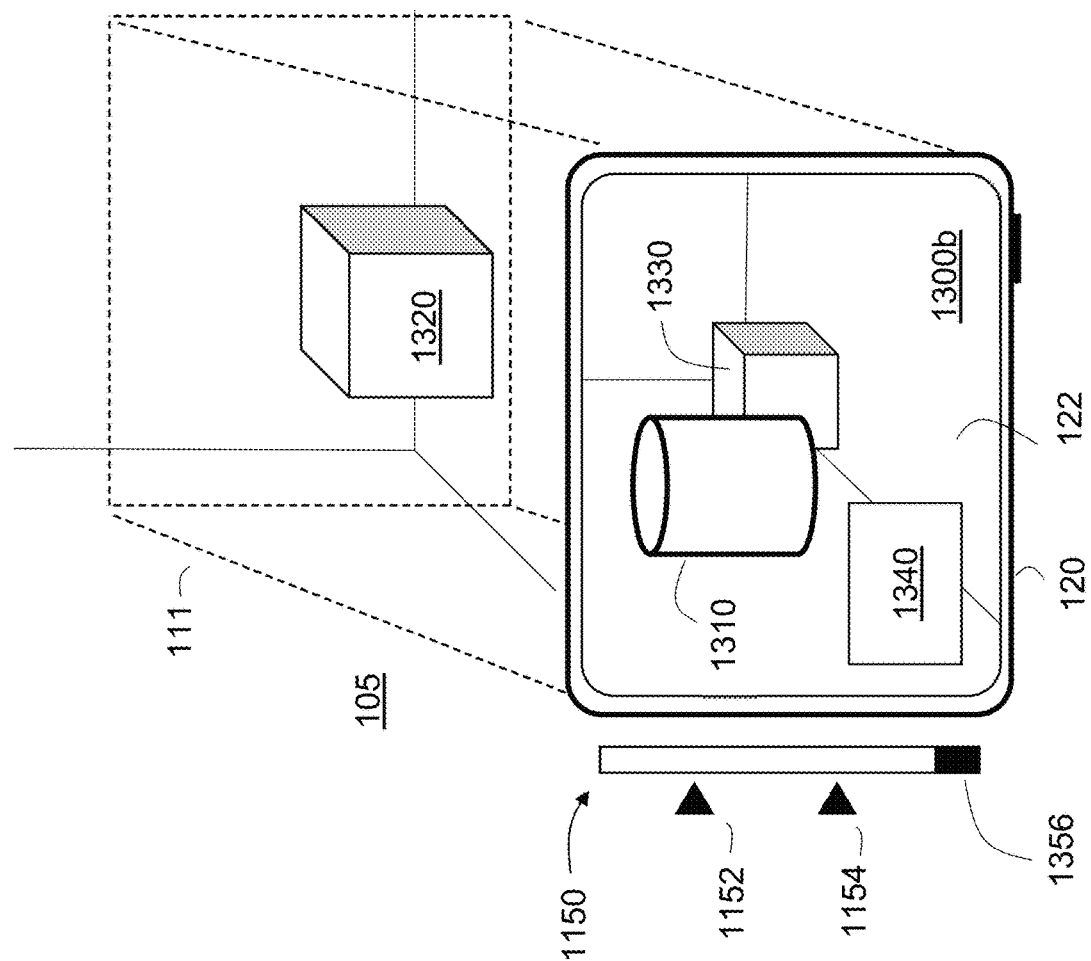

As shown in FIG. 13B, in response to a determination that the viewability metric 1356 does not exceed the critical viewability threshold 1152 and does not exceed the recommended viewability threshold 1154, the electronic device 120 obtains or retains the unmodified viewable environment 1300*b* including the unmodified virtual object 1310. In some implementations, the electronic device 120 may present at least one viewability object 1340 within the modified viewable environment 1300*b*. In some implementations, the viewability object 1340 includes quantitative or qualitative information associated with one or more aspects of the unmodified virtual object 1310 or the modified viewable environment 1300*b*. In some implementations, the viewability object 1340 includes audio, video, text, augmented reality objects or events, virtual reality objects or events, or other similar static or dynamic content.

Figure 14:
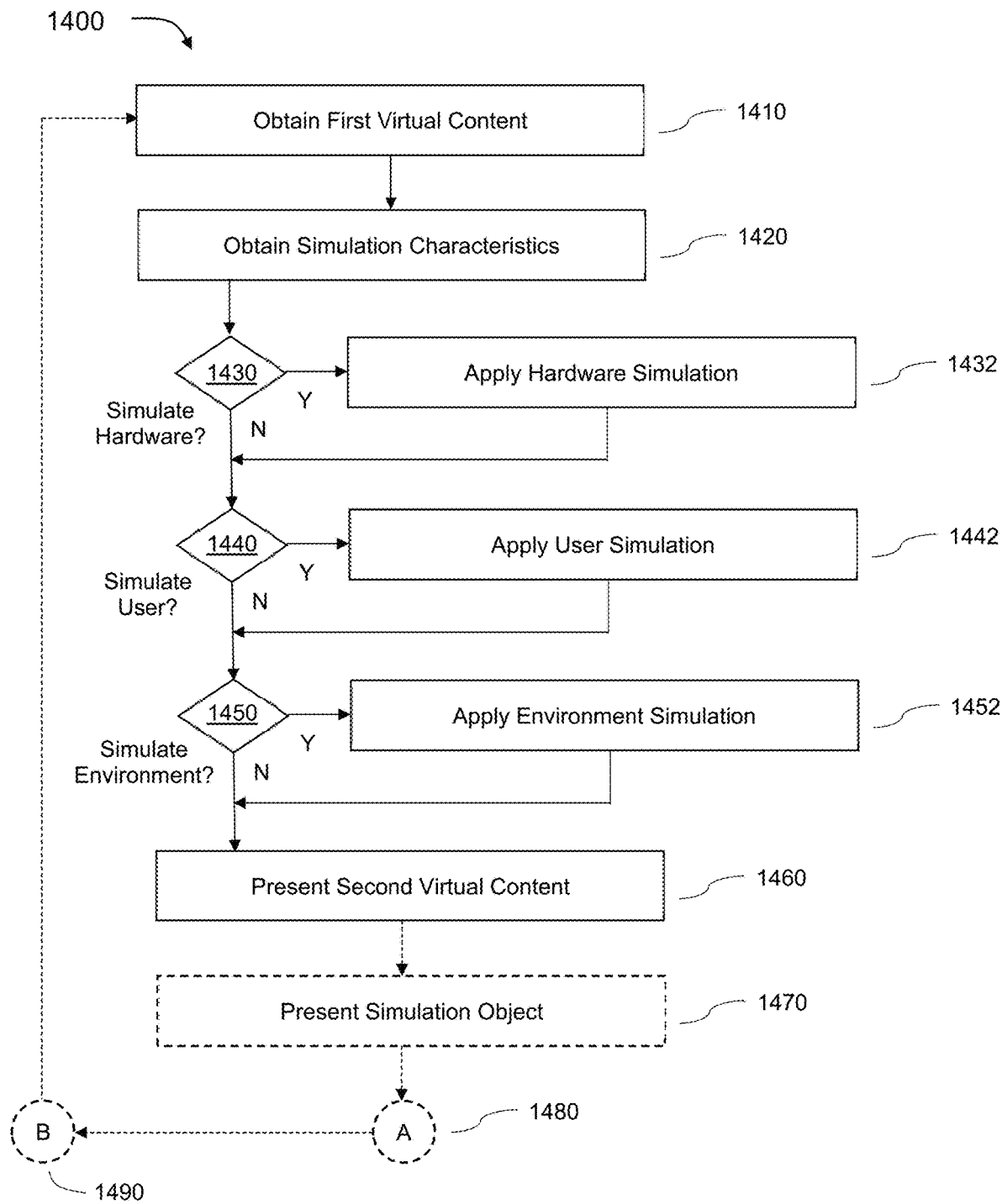
FIG. 14 is a flowchart representation of a method of modifying virtual content according to various simulation characteristics, in accordance with some implementations.

FIG. 14 is a flowchart representation of a method 1400 of modifying virtual content according to various simulation characteristics in accordance with some implementations. In various implementations, the method 1400 is performed by a computing system including non-transitory memory and one or more processors, wherein the computing system is communicatively coupled to a display device and one or more input devices (e.g., the controller 110 in FIGS. 1 and 2; the electronic device 120 in FIGS. 1 and 3; or a suitable combination thereof), or a component thereof. In some implementations, the method 1400 is performed by processing logic, including hardware, firmware, software, or a combination thereof. In some implementations, the method 1400 is performed by a processor executing code stored in a non-transitory computer-readable medium (e.g., a memory). In various implementations, some operations in method 1400 are, optionally, combined and/or the order of some operations is, optionally, changed.

As described above, for example, a user may attempt to simulate visual content intended for display on an optical see-through display by presenting that imagery on an opaque display without see-through functionality (e.g., LCD, LED, OLED, CRT, or the like). Imagery may appear differently to viewers when presented on an optical see-through display compared to an opaque display. Current systems lack logic to simulate the differences inherent to presentation of imagery on optical see-through displays and present that imagery accurately onto an opaque display. Simulating aspects of presentation of imagery on a see-through display with an opaque display can enhance efficiency and effectiveness of prototyping, developing, and testing systems and devices incorporating optical see-through displays. Thus, according to some implementations, a virtual content modification and simulation system in accordance with the method 1400 will present virtual content on an opaque display with presentation characteristics associated with a particular see-through display or type of see-through display.

As represented by block 1410, the method 1400 includes obtaining first virtual content. In some implementations, the first virtual content includes virtual content or XR content. In some implementations, the first virtual content comprises an XR environment. In some implementations, obtaining the first virtual content includes one or more of receiving data or metadata from an external device, node, or server; retrieving data or metadata from a local memory or an external device, node or server; or generating data or metadata at a local device. In some implementations, the first virtual content corresponds to visual content includes one or more virtual objects, images, text, animations, of the like. In some implementations, an optical see-through display includes a wearable display with a transparent or semi-transparent surface. The transparent or semi-transparent surface can allow an environment on one side of the surface to be visible from an opposite side of the surface. In some implementations, the XR environment is a composite of a video feed of a physical environment with XR content. In some implementations, a first XR environment comprises a view of a live or recorded physical environment from the point of view of a user (a "first-person" perspective). In some implementations, an XR object comprises a two-dimensional or three-dimensional XR object or a two-dimensional text, image, video, or like content presented over the physical environment. In some implementations, the data obtainer 242 or 342 obtains unmodified content, in accordance with implementations described or supported thereby, as represented by block 1410.

As represented by block 1420, the method 1400 includes obtaining simulation characteristics. In some implementations, simulation characteristics are associated with an XR environment, a representation of the XR environment, or any other aspect of XR content display, storage, management, or distribution. As one example, the simulation characteristics include hardware device characteristics of associated with an optical see-through display, user characteristics of a user of the optical see-through display, and environment characteristics of an environment in which the optical see-through display occupies or may occupy. Simulation characteristics may comprise one or more characteristics associated with normal, fault, emergency, and unusual operation or conditions of the device, user, and environment. In some implementations, a user manually selects or inputs the simulation characteristics during, for example, a prototyping or AB testing process. In some implementations, the simulation characteristic obtainer 400 obtains simulation characteristics, in accordance with implementations described or supported thereby, as represented by block 1420.

As one example, the simulation characteristics correspond to simulating an optical see-through display on a video pass-through device. As such, in some implementations, a presentation on the optical see-through display includes visual content integrated with a physical environment visible through a transparent or semi-transparent surface of the optical see-through display. Integration may include overlay, proximal placement, or other visual organization scheme or schemes.

As represented by block 1430, the method 1400 includes determining whether to simulate hardware. In some implementations, a device obtains simulation characteristics associated with specific features, limitations, behaviors, or other defining or differentiating properties of the hardware device being used, designed, modeled, tested, simulated, or observed in another manner or for another purpose. In some implementations, the virtual experience engine 240 or the virtual presentation engine 340 determines whether to simulate hardware, in accordance with implementations described or supported thereby, as represented by block 1430.

As represented by block 1432, the method 1400 includes applying a hardware simulation (e.g., the "Yes" branch from block 1430) based on one or more hardware lens characteristics. In some implementations, the hardware simulation engine 410 applies the hardware simulation to the first virtual content and/or the viewable environment associated therewith to generate second virtual content, in accordance with implementations described or supported thereby, as represented by block 1432.

In some implementations, the hardware simulation may comprise at least one hardware lens simulation as shown by way of example in FIGS. 5A and 5B, or 6A and 6B. In some implementations, the hardware simulation may comprise at least one hardware refresh or hardware type simulation as shown by way of example in FIGS. 7A and 7B. In some implementations, the hardware simulation may change rendering based on display type. As one example, when simulating an opaque display, the device is able to render opaque objects and simulate occlusion between virtual objects and/or between virtual and real objects. However, on an additive display that allows for the addition but not the subtraction of light, the device cannot render opaque objects or simulate occlusion have occlusion between virtual and real objects due to the limitations of the additive display. Continuing with this example, if the device displays a virtual ball (that should be opaque) over a blue wall, the user will perceive both the light from the ball and the blue color from the background in the area where the virtual ball and the blue wall overlap.

As represented by block 1440, the method 1400 includes determining whether to simulate user characteristics. In some implementations, a device obtains simulation characteristics associated with specific features, limitations, behaviors, or other defining or differentiating properties of a real or virtual exemplary user of the device or a device or system associated with the device. In some implementations, the virtual experience engine 240 or the virtual presentation engine 340 determines whether to simulate user characteristics, in accordance with implementations described or supported thereby, as represented by block 1440.

As represented by block 1442, the method 1400 includes applying a user simulation (e.g., the "Yes" branch from block 1440) based on one or more user characteristics. In some implementations, the user simulation engine 420 applies the user simulation to the first virtual content and/or the viewable environment associated therewith to generate second virtual content, in accordance with implementations described or supported thereby, as represented by block

1442. In some implementations, a user simulation may comprise at least one user color simulation as shown by way of example in FIGS. 8A and 8B.

As represented by block 1450, the method 1400 includes determining whether to simulate an environment. In some implementations, a device obtains simulation characteristics associated with specific features, limitations, behaviors, or other defining or differentiating properties of a real or virtual exemplary environment in which the user, device, or a device or system associated with the user may operate. In some implementations, the virtual experience engine 240 or the virtual presentation engine 340 determines whether to simulate the environment, in accordance with implementations described or supported thereby, as represented by block 1450.

As represented by block 1452, the method 1400 includes applying an environment simulation (e.g., the "Yes" branch from block 1450) based on one or more environmental characteristic. In some implementations, the environment simulation engine 430 applies the user simulation to the first virtual content and/or the viewable environment associated therewith to generate second virtual content, in accordance with implementations described or supported thereby, as represented by block 1452. In some implementations, an environment simulation may comprise at least one environment simulation as shown by way of example in FIGS. 9A and 9B, or 10A and 10B.

One of ordinary skill in the art will appreciate that the hardware simulation in block 1432, the user simulation in block 1442, and/or the environment simulation in block 1452 may be performed sequentially (according to various orders) or in parallel on the first virtual content and/or the viewable environment associated therewith in various implementations.

As represented by block 1460, the method 1400 includes presenting second virtual content. In some implementations, modifying the at least one visual property of the foreground object includes modifying color, transparency, luminosity, sharpness or chromatic characteristics of the background (i.e., the physical environment) or foreground (i.e., the XR content) of the first XR environment. In some implementations, modifying the at least one visual property of the foreground object includes changing the location, shape, size, cropping, or spatial characteristic of the XR content within the first XR environment. In some implementations, presenting at least the portion of the modified foreground object includes rendering modified visual content proximate to or overlaid upon background content. In some implementations, the background content includes a prerecorded or live scene. In some implementations, the background content includes particular environmental conditions for testing visual output. In some implementations, the virtual renderer 246 or the virtual presenter 346 presents modified or unmodified content, in accordance with implementations described or supported thereby, as represented by block 1460.

As represented by block 1470, the method 1400 includes presenting a simulation object. In some implementations, a simulation object is a graphical representation identifying, isolating, emphasizing or otherwise associated with at least one viewable object or region within a viewable environment In some implementations, presenting the simulation object includes displaying a simulation identifier, complete or abbreviated quantitative value associated with one or more simulation characteristics, or a tier, rank, group, symbol, or any characterization of a quantitative or qualitative value associated with the simulation. In some implementations, a device presents a simulation object in real-time or substantially real-time within a viewable environment. In some implementations, the virtual renderer 246 or the virtual presenter 346 presents the simulation object, in accordance with implementations described or supported thereby, as represented by block 1470. In some implementations, the viewability object 540, 640, 740, 840, 940 or 1040 as shown by way of example in FIGS. 5B, 6B, 7B, 8B, 9B, and 10B may include a simulation object.

As represented by block 1480, the method 1400 optionally continues to method 1500. In some implementations, the virtual experience engine 240 or the virtual presentation engine 340 continues to method 1500, in accordance with implementations described or supported thereby, as represented by block 1480.

As represented by block 1490, the method 1400 optionally returns to block 1410. In some implementations, the virtual experience engine 240 or the virtual presentation engine 340 returns to block 1410, in accordance with implementations described or supported thereby, as represented by block 1490.

In some implementations, the method 1400 includes obtaining first virtual content; obtaining one or more simulation characteristics; generating second virtual content by modifying the first virtual content according to the one or more simulation characteristics; and presenting the second virtual content.

Figure 15:
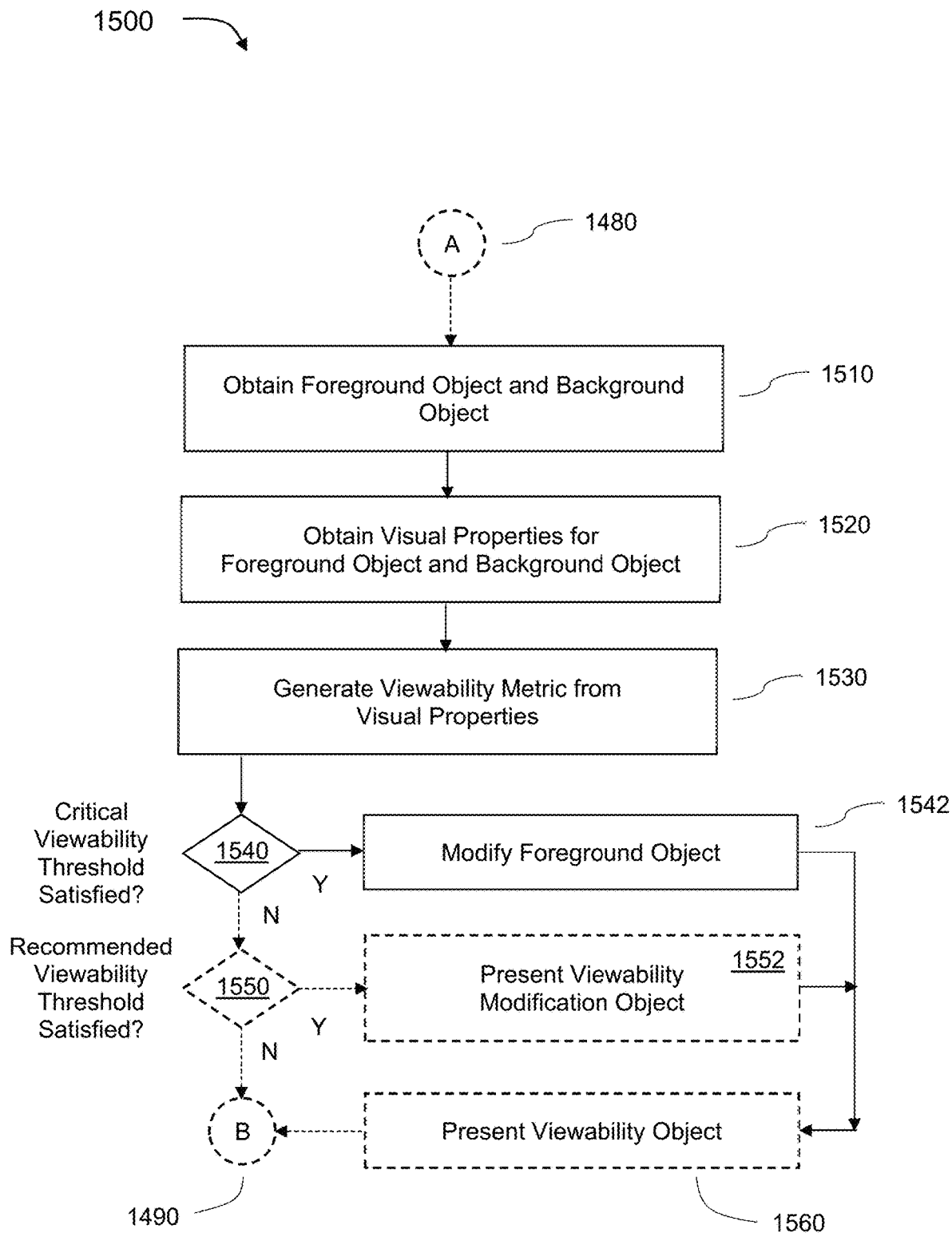
FIG. 15 is a flowchart representation of a method of improving user perception of virtual content, in accordance with some implementations.

FIG. 15 is a flowchart representation of a method 1500 of improving user perception of virtual content in accordance with some implementations. In various implementations, the method 1500 is performed by a computing system including non-transitory memory and one or more processors, wherein the computing system is communicatively coupled to a display device and one or more input devices (e.g., the controller 110 in FIGS. 1 and 2; the electronic device 120 in FIGS. 1 and 3; or a suitable combination thereof), or a component thereof. In some implementations, the method 1500 is performed by processing logic, including hardware, firmware, software, or a combination thereof. In some implementations, the method 1500 is performed by a processor executing code stored in a non-transitory computer-readable medium (e.g., a memory). In various implementations, some operations in method 1500 are, optionally, combined and/or the order of some operations is, optionally, changed.

As one example, imagery presented on a simulated optical see-through display may be placed in or proximate to a static or dynamically changing region of the display, which, in turn, causes user perception of the imagery to be difficult. Current systems lack logic to identify potential user perception difficulties or to suggest alternatives placement for content. Thus, according to some implementations, a virtual content modification and simulation system in accordance with the method 1500 presents notifications or modifies virtual content on a simulated optical see-through display when one or more metrics indicate difficulty with user perception of the virtual content.

As represented by block 1480, the method 1500 optionally continues from the method 1400. In some implementations, the virtual experience engine 240 or the virtual presentation engine 340 continues from method 1400, in accordance with implementations described or supported thereby, as represented by block 1480.

As represented by block 1510, the method 1500 includes obtaining a foreground object and a background object. In some implementations, obtaining the foreground object and the background object includes one or more of receiving data or metadata from an external device, node, or server; retrieving data or metadata from a local memory or an external device, node or server; or generating data or metadata at a local device. In some implementations, a foreground object includes one or more virtual objects, images, text, animations, of the like. In some implementations, a background object includes a prerecorded or live real-world scene within the field of view of a user, device, or system associated with the user or device. In some implementations, the foreground object includes an augmented reality or mixed reality object. In some implementations, the viewability engine 250 obtains the foreground image and the background image, in accordance with implementations described or supported thereby, as represented by block 1510. In some implementations, block 1510 may obtain any of the foreground objects 1110*a*, 1210, and 1310, and the background objects 1130, 1230, and 1330 as shown by way of example in FIGS. 11A, 12A, and 13A.

As one example, during a simulation operation, the method 1500 includes simulating an optical see-through display on a video pass-through device. In some implementations, an optical see-through display includes a wearable display with a transparent or semi-transparent surface. The transparent or semi-transparent surface can allow an environment on one side of the surface to be visible from an opposite side of the surface.

As represented by block 1520, the method 1500 includes obtaining visual properties for a foreground object relative to a background object. In some implementations, the foreground object has various color, transparency, movement, or any visual property facilitating comparison to at least a portion of the background object. In some implementations, the viewability analyzer 252 obtains the visual properties for the foreground image and the background image, in accordance with implementations described or supported thereby, as represented by block 1520. In some implementations, block 1520 may obtain visual properties for any of the foreground objects 1110*a*, 1210, and 1310, and the background objects 1130, 1230, and 1330 as shown by way of example in FIGS. 11A, 12A, and 13A.

As represented by block 1530, the method 1500 includes generating a viewability metric from the visual properties. In some implementations, the viewability metric comprises a numerical threshold, tier, ranking, approximation, or any quantitative value representing a level of ease or difficulty in viewing the foreground object proximate to the background object. In some implementations, the viewability metric comprises a qualitative recommendation, a grouping, one or more characters, one or more words, one or more symbols, one or more glyphs, or any qualitative information representing a level of ease or difficulty in viewing the foreground object proximate to the background environment. In some implementations, the viewability metric incorporates metrics tailored to particular hardware, user, environment characteristics. In some implementations, aggregation includes at least one of a principal component analysis, a neural net, a deep learning network, a machine learning system, and any mathematical or quantitative model for multifactor analysis. In some implementations, the viewability analyzer 252 generates the viewability metric, in accordance with implementations described or supported thereby, as represented by block 1530. In some implementations, block 1530 may generate a viewability metric in accordance with the viewability metrics 1156*a*, 1156*b*, 1256 or 1356, as shown by way of example in FIGS. 11A, 11B, 12A and 13A.

As represented by block 1540, the method 1500 includes determining whether a critical viewability threshold is satisfied. In some implementations, a critical viewability threshold represents a value, range, or condition in which viewing a foreground object and a background object with a particular viewability metric materially reduces a predetermined user's ability to view a foreground object. A material reduction in viewability includes, but is not limited to, lack of contract, between objects, high interference from brightness, color or transparency, or difficulty in viewing an object proximate to particular patterns of static or changing color, light, or shape. As one example, a critical viewability threshold indicates that relative brightness or contrast levels make difficult the viewing of the foreground object against the background object. In some implementations, the viewability analyzer 252 determines whether the critical viewability threshold is satisfied, in accordance with implementations described or supported thereby, as represented by block 1540. In some implementations, block 1540 may determine whether a critical viewability threshold is satisfied in accordance with the critical viewability threshold 1152, as shown by way of example in FIGS. 11A, 11B, 12A, 12B, 13A, and 13B.

As represented by block 1542, the method 1500 includes modifying the foreground object (e.g., the "Yes" branch from block 1540). In some implementations, a device presents a foreground object with one or more characteristics modified to enhance viewability of the foreground object with respect to a portion of the background object proximate to or below the foreground object. In some implementations, the device presents information relevant to the modification. Information relevant to the modification may include, but is not limited to, color, transparency, luminosity, sharpness or chromatic characteristic of the visual content. In some implementations, modifying the foreground object includes presenting the foreground object proximate to or overlaid upon the background object. In some implementations, the mitigation engine 254 modifies the foreground object, in accordance with implementations described or supported thereby, as represented by block 1542. In some implementations, block 1542 may modify the foreground object 1110*b*, as shown by way of example in FIG. 11B.

As represented by block 1550, the method 1500 includes determining whether a recommended viewability threshold is satisfied. In some implementations, a recommended viewability threshold represents a value, range, or condition in which viewing a foreground object and a background object with a particular viewability metric at least partly reduces a predetermined user's ability to view a foreground object. A reduction in viewability includes, but is not limited to, lack of contrast between objects, high interference from brightness, color or transparency, or difficulty in viewing an object proximate to particular patterns of static or changing color, light, or shape at any predetermined level or amount. In some implementations, a viewability modification object identifies a foreground object or a visual property of a foreground object. As one example, a viewability modification object may include a border drawn around an object, text associated with an object, or other portion of the object having a particular contrast level satisfying the recommended viewability threshold. In some implementations, the viewability analyzer 252 determines whether the recommended viewability threshold is satisfied, in accordance with implementations described or supported thereby, as represented by block 1550. In some implementations, block 1550 may determine whether a recommended viewability threshold is satisfied in accordance with the recommended viewability threshold 1154, as shown by way of example in FIGS. 11A, 11B, 12A, 12B, 13A, and 13B.

As represented by block 1552, the method 1500 includes presenting a viewability modification object (e.g., the "Yes" branch from block 1550). In some implementations, a device presents a viewability modification object in real-time or substantially real-time as a background object changes. As one example, the background object may change through movement of a real or simulated camera, changes in lighting in a physical environment, or any change in a live or prerecorded image or video representing a physical environment. In some implementations, the virtual renderer 246 or the virtual presenter 346 presents the viewability modification object, in accordance with implementations described or supported thereby, as represented by block 1552. In some implementations, block 1540 may present the viewability modification object 1260, as shown by way of example in FIG. 12B.

As represented by block 1560, the method 1500 includes presenting a viewability object. In some implementations, a viewability object is a graphical representation of at least one viewability metric associated with a foreground object. In some implementations, presenting the viewability object includes displaying a complete or abbreviated quantitative value associated with the viewability metric, or a tier, rank, group, symbol, or any characterization of a quantitative or qualitative value associated with the viewability metric. In some implementations, a device presents a viewability object in real-time or substantially real-time as a background object changes. In some implementations, the virtual renderer 246 or the virtual presenter 346 presents the viewability object, in accordance with implementations described or supported thereby, as represented by block 1560. In some implementations, block 1560 may present the viewability object 1140, 1240, or 1340, as shown by way of example in FIGS. 11B, 12B, and 13B.

As represented by block 1490, the method 1500 optionally returns to block 1410 of method 1400. In some implementations, the virtual experience engine 240 or the virtual presentation engine 340 returns to block 1410, in accordance with implementations described or supported thereby, as represented by block 1490.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device including an opaque display, non-transitory memory, and one or more processors:
obtaining first virtual content;
obtaining one or more simulation characteristics of an optical see-through device including a transparent display;
generating second virtual content by modifying the first virtual content according to the one or more simulation characteristics; and
presenting the second virtual content via the opaque display.

2. The method of claim 1, wherein the first virtual content comprises a composite of at least one virtual object, image, or annotation overlaid upon a visual representation of a physical environment.

3. The method of claim 1, wherein the one or more simulation characteristics comprise lens characteristics of at least one optical see-through lens.

4. The method of claim 3, wherein the lens characteristics comprise at least a polarization simulation characteristic, and wherein generating the second virtual content further comprises modifying at least one of brightness and contrast of the first virtual content based on at least a difference between an environment reference angle associated with the first virtual content and a polarization reference angle.

5. The method of claim 3, wherein the lens characteristics comprise at least a curvature simulation, and wherein generating the second virtual content further comprises modifying at least one of a focal length or a radius of curvature of a viewport associated with the first virtual content.

6. The method of claim 3, wherein the lens characteristics comprise at least a color simulation, and wherein generating the second virtual content further comprises modifying at least one of an additive color property, a subtractive color property, a saturation property, a hue property, a tint, one or more CMYK values, one or more RGB values, or like property of visual or near-visual spectrum.

7. The method of claim 1, wherein the one or more simulation characteristics comprise at least a refresh rate simulation, and wherein generating the second virtual content further comprises modifying a refresh frequency of at least a portion of the first virtual content.

8. The method of claim 1, wherein the one or more simulation characteristics comprise at least a refresh type simulation, and wherein generating the second virtual content further comprises modifying an order of presenting at least a portion of the first virtual content.

9. An electronic device comprising:
an opaque display;
one or more processors;
a non-transitory memory; and
one or more programs stored in the non-transitory memory, which, when executed by the one or more processors, cause the electronic device to:
obtain first virtual content;
obtain one or more simulation characteristics of an optical see-through device including a transparent display;
generate second virtual content by modifying the first virtual content according to the one or more simulation characteristics; and
present the second virtual content via the opaque display.

10. The electronic device of claim 9, wherein the first virtual content comprises a composite of at least one virtual object, image, or annotation overlaid upon a visual representation of a physical environment.

11. An electronic device of claim 9, wherein the one or more simulation characteristics comprise lens characteristics of at least one optical see-through lens.

12. The electronic device of claim 11, wherein the lens characteristics comprise at least a polarization simulation characteristic and the one or more programs cause the electronic device to generate the second virtual content by modifying at least one of brightness and contrast of the first virtual content based on at least a difference between an environment reference angle associated with the first virtual content and a polarization reference angle.

13. The electronic device of claim 11, wherein the lens characteristics comprise at least a curvature simulation and the one or more programs cause the electronic device to generate the second virtual content by modifying at least one of a focal length or a radius of curvature of a viewport associated with the first virtual content.

14. The electronic device of claim 11, wherein the lens characteristics comprise at least a color simulation and the one or more programs cause the electronic device to generate the second virtual content by modifying at least one of an additive color property, a subtractive color property, a saturation property, a hue property, a tint, one or more CMYK values, one or more RGB values, or like property of visual or near-visual spectrum.

15. A non-transitory memory storing one or more programs, which, when executed by one or more processors of an electronic device including an opaque display, cause the electronic device to:
obtain first virtual content;
obtain one or more simulation characteristics of an optical see-through device including a transparent display;
generate second virtual content by modifying the first virtual content according to the one or more simulation characteristics; and
present the second virtual content via the opaque display.

16. The non-transitory memory of claim 15, wherein the first virtual content comprises a composite of at least one virtual object, image, or annotation overlaid upon a visual representation of a physical environment.

17. The non-transitory memory of claim 15, wherein the one or more simulation characteristics comprise lens characteristics of at least one optical see-through lens.

18. The non-transitory memory of claim 17, wherein the lens characteristics comprise at least a polarization simulation characteristic and the one or more programs cause the electronic device to generate the second virtual content by modifying at least one of brightness and contrast of the first virtual content based on at least a difference between an environment reference angle associated with the first virtual content and a polarization reference angle.

19. The non-transitory memory of claim 17, wherein the lens characteristics comprise at least a curvature simulation and the one or more programs cause the electronic device to generate the second virtual content by modifying at least one of a focal length or a radius of curvature of a viewport associated with the first virtual content.

20. The non-transitory memory of claim 17, wherein the lens characteristics comprise at least a color simulation and the one or more programs cause the electronic device to generate the second virtual content by modifying at least one of an additive color property, a subtractive color property, a saturation property, a hue property, a tint, one or more CMYK values, one or more RGB values, or like property of visual or near-visual spectrum.

* * * * *